United States Patent
Tsai et al.

(10) Patent No.: US 8,441,441 B2
(45) Date of Patent: May 14, 2013

(54) USER INTERFACE FOR MOBILE DEVICES

(75) Inventors: Ming-Chang Tsai, San Diego, CA (US); Chienchung Chang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 988 days.

(21) Appl. No.: 12/401,758

(22) Filed: Mar. 11, 2009

(65) Prior Publication Data

US 2010/0174421 A1  Jul. 8, 2010

Related U.S. Application Data

(60) Provisional application No. 61/142,806, filed on Jan. 6, 2009.

(51) Int. Cl.
*G06F 3/01* (2006.01)

(52) U.S. Cl.
USPC ......................................................... 345/157

(58) Field of Classification Search .................. None
See application file for complete search history.

(56) References Cited

U.S. PATENT DOCUMENTS

| | | | |
|---|---|---|---|
| 4,746,770 A | 5/1988 | McAvinney |
| 6,798,429 B2 | 9/2004 | Bradski |
| 7,403,220 B2 | 7/2008 | MacIntosh et al. |
| 2001/0052895 A1 | 12/2001 | Anvekar |
| 2002/0140666 A1 | 10/2002 | Bradski |
| 2006/0038890 A1 | 2/2006 | MacIntosh et al. |

FOREIGN PATENT DOCUMENTS

| | | |
|---|---|---|
| EP | 1574939 A1 | 9/2005 |
| EP | 1884864 A | 2/2008 |
| EP | 1884864 A1 | 2/2008 |
| JP | 4112383 A | 4/1992 |
| JP | 10254614 A | 9/1998 |
| JP | 2002007027 A | 1/2002 |
| JP | 2004534302 A | 11/2004 |
| JP | 2005215031 A | 8/2005 |
| JP | 2006146440 A | 6/2006 |
| JP | 2007166474 A | 6/2007 |
| WO | 2005003986 A | 1/2005 |
| WO | WO2005003986 | 1/2005 |
| WO | 2006036069 A | 4/2006 |
| WO | WO2006036069 | 6/2006 |

OTHER PUBLICATIONS

International Preliminary Report on Patentability—PCT/US2009/037501, The International Bureau of WIPO—Geneva, Switzerland, Jan. 24, 2011.

(Continued)

*Primary Examiner* — Wayne Young
*Assistant Examiner* — Brian Butcher
(74) *Attorney, Agent, or Firm* — Nicholas A. Cole

(57) ABSTRACT

A mobile user interface suitable for mobile computing devices uses device position/orientation in real space to select a portion of content that is displayed. Content (e.g., documents, files or a desktop) is presumed fixed in virtual space with the mobile user interface displaying a portion of the content as if viewed through a camera or magnifying glass. Data from motion, distance or position sensors are used to determine the relative position/orientation of the device with respect to the content to select the portion for display. Content elements can be selected by centering the display on the desired portion, obviating the need for cursors and pointing devices (e.g., mouse or touchscreen). Magnification can be manipulated by moving the device away from or towards the user. 3-D content viewing may be enabled by sensing the device orientation and displaying content that is above or below the display in 3-D virtual space.

52 Claims, 19 Drawing Sheets

OTHER PUBLICATIONS

International Search Report, PCT/US2009/037501. International Search Authority—European Patent Office. Oct. 7, 2009.

Written Opinion of the International Searching Authority, PCT/US2009/037501, International Search Authority—European Patent Office, Oct. 7, 2009.

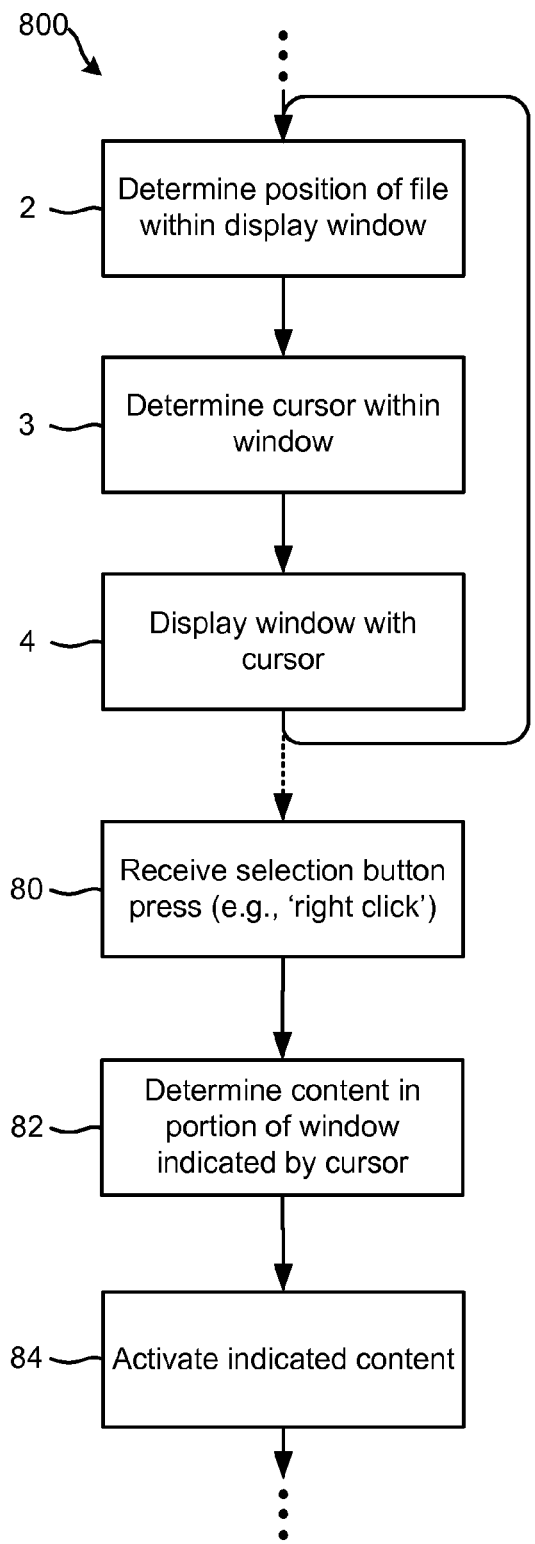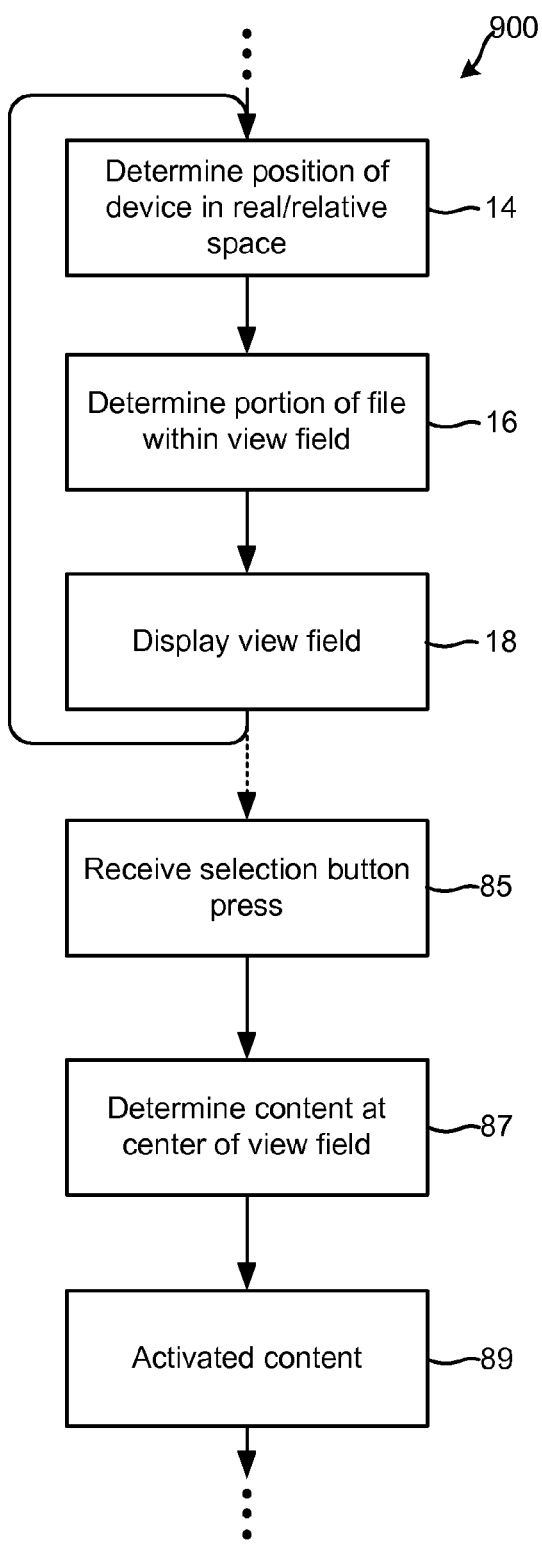
(prior art)
FIG. 8
FIG. 9

USER INTERFACE FOR MOBILE DEVICES

The present application claims the benefit of priority to U.S. Provisional Patent Application No. 61/142,806 filed Jan. 6, 2009 entitled "User Interface for Mobile Devices," the entire contents of which are hereby incorporated by reference.

FIELD OF THE INVENTION

The present invention relates generally to computer user interface systems and more particularly to a user interface for mobile computing devices.

BACKGROUND

Personal electronic devices (e.g. cell phones, PDAs, laptops, gaming devices) provide users with increasing functionality and data storage. To enable users to interact with applications and files, personal electronic devices typically are configured with a user interface that is similar to graphical user interfaces developed for personal computers. For example, some personal electronic devices use Windows CE® which is a version of the Windows® family of operating systems sold by Microsoft Corporation. Such graphical user interface systems presume that the computing device is fixed in space while content (e.g., images, objects and files) is moveable within virtual space. Such graphical user interface system typically include tools (e.g., scroll bars) for manipulating content with respect to the "window" of the device's display. Even recently released user interfaces developed specifically for new personal electronic devices, such as the user interface implemented on the Blackberry Storm®, presume that the device is fixed in space while content is moveable in virtual space, and enable movement ("dragging") of content with respect to the device's display by drawing a finger across the touch screen display. While such user interfaces are familiar to computer users, their derivation from generally immobile personal computers compromises functionality of mobile computing devices.

SUMMARY

Various aspects provide methods and systems for providing a mobile user interface particularly well suited for mobile computing devices. In one aspect, a method for providing a mobile user interface on a mobile computing device includes sensing a movement in real space of the mobile computing, determining a change in position in real space of the mobile computing device based upon the sensed movement, determining a viewing perspective of a content treated as fixed in virtual space based upon the determined change in position of the mobile computing device, and generating a display of at least a portion of the content based upon the determined viewing perspective. The method may further include receiving a signal to select a selection of the content, determining a part of the content located near a center of the display, and selecting the part of the content located near a center of the display. A selection aid may also be provided within the generated display to indicate the center of the display and/or the part of the content within the display that will be selected. The selection aid form and size may be selected based or depending upon the content, and the form of the selection aid may include, for example, any of crosshairs, a circle, an oval, a box, a region of enhanced brightness, a region of enhanced definition, and a region of shading. The signal to select a selection of the content may be received as a result of a button press. The method may further involve including a selection aid within the generated display, wherein the selection aid indicates a part of the content within the display that can be selected, receiving a signal to select a selection of the content, determining the part of the content located within the selection aid, and performing an action on the part of the content located within the selection aid. Sensing a movement in real space may include receiving a signal from a sensor which may be any one or more of an accelerometer, a distance measuring sensor, a tilt sensor, a camera, and a compass. The method may further include determining a distance between the mobile computing device and a user, and applying a magnification to the displayed portion of the content based upon the determined distance. The method may further include sensing tilt of the mobile computing device and repositioning the content in virtual space based upon the sensed tilt. Sensing a movement in real space may involve receiving a digital image from a camera, comparing at least a portion of the received digital image to at least a portion of a previous digital image to identify a change in sequential images, and determining a movement based upon the identified change in the sequential images. Determining the viewing perspective of the content treated as fixed in virtual space may also be based upon a virtual movement scaling factor applied to the determined change in position of the mobile computing device. The method may further include receiving a user interface mode selection input (which may be in the form of a button press) while in a graphical user interface mode, fixing the content in virtual space based upon a display of the content in the graphical user interface mode, and implementing a mobile user interface mode as described herein, as well as receiving a user interface mode selection input while in the mobile user interface mode, fixing the content in the a mobile computing device display, and implementing the graphical user interface mode.

In another aspect, a mobile computing device includes a processor or dedicated graphics processing chip, a display coupled to the processor or dedicated graphics processing chip, and a sensor coupled to the processor or dedicated graphics processing chip in which the sensor may be any one or more of an accelerometer, a distance measuring sensor, a tilt sensor, a camera, and a compass. The processor or dedicated graphics processing chip is configured with software executable instructions to receive a signal from the sensor, determine a change in position in real space of the mobile computing device based upon the receive sensor signal, determine a viewing perspective of a content treated as fixed in virtual space based upon the determined change in position of the mobile computing device, and generate an image on the display of at least a portion of the content based upon the determined viewing perspective. The processor or dedicated graphics processing chip may be further configured to receive a signal to select a selection of the content, determine a part of the content located near a center of the display, and select the part of the content located near a center of the display. A selection aid may also be provided within the generated display to indicate the center of the display and/or the part of the content within the display that will be selected. The selection aid form and size may be selected based or depending upon the content, and the form of the selection aid may include, for example, any of crosshairs, a circle, an oval, a box, a region of enhanced brightness, a region of enhanced definition, and a region of shading. The signal to select a selection of the content may be in the form of a button press. The processor or dedicated graphics processing chip may be further configured to include a selection aid within the generated display, wherein the selection aid indicates a part of the content within the display that can be selected, receive a signal to select a selection of the content, determine the part of the content located within the selection aid, and perform an action on the part of the content located within the selection aid. The processor or dedicated graphics processing chip may be further configured to receive a signal from one or more sensor which may be any one or more of an accelerometer, a distance measuring sensor, a tilt sensor, a camera, and a compass. The processor or dedicated graphics processing chip may be further configured to determine a distance between the mobile computing device and a user, and apply a magnification to the displayed portion of the content based upon the determined distance. The processor or dedicated graphics processing chip may be further configured to sense tilt of the mobile computing device and reposition the content in virtual space based upon the sensed tilt. The processor or dedicated graphics processing chip may be further configured to receive a digital image from a camera, compare at least a portion of the received digital image to at least a portion of a previous digital image to identify a change in sequential images, and determine a movement based upon the identified change in the sequential images. The processor or dedicated graphics processing chip may be further configured so that determination of the viewing perspective of the content treated as fixed in virtual space is also be based upon a virtual movement scaling factor applied to the determined change in position of the mobile computing device. The processor or dedicated graphics processing chip may be further configured to receive a user interface mode selection input (which may be in the form of a button press) while in a graphical user interface mode, fix the content in virtual space based upon a display of the content in the graphical user interface mode, and implement a mobile user interface mode as described herein, as well as receive a user interface mode selection input while in the mobile user interface mode, fix the content in the a mobile computing device display, and implement the graphical user interface mode.

In another aspect, a mobile computing device includes a means for sensing a movement of the mobile computing in real space, a means for determining a change in position of the mobile computing device in real space based upon the sensed movement, a means for determining a viewing perspective of a content treated as fixed in virtual space based upon the determined change in position of the mobile computing device, and a means for generating a display of at least a portion of the content based upon the determined viewing perspective. The mobile computing device may further include a means for receiving a signal to select a selection of the content, a means for determining a part of the content located near a center of the display, and a means for selecting the part of the content located near a center of the display. The mobile computing device may further include a means for providing a selection aid within the generated display to indicate the center of the display and/or the part of the content within the display that will be selected. The selection aid form and size may be selected based or depending upon the content, and the form of the selection aid may include, for example, any of crosshairs, a circle, an oval, a box, a region of enhanced brightness, a region of enhanced definition, and a region of shading. The signal to select a selection of the content may be received as a result of a button press. The mobile computing device may further include a means for including a selection aid within the generated display, wherein the selection aid indicates a part of the content within the display that can be selected, a means for receiving a signal to select a selection of the content, a means for determining the part of the content located within the selection aid, and a means for performing an action on the part of the content located within the selection aid. The means for sensing a movement in real space may include a means for receiving a signal from any one or more of a means for measuring acceleration, a means for measuring distance, a means for measuring tilt, a means for obtaining an image, and a compass. The mobile computing device may further include a means for determining a distance between the mobile computing device and a user, and a means for applying a magnification to the displayed portion of the content based upon the determined distance. The mobile computing device may further include a means for sensing tilt of the mobile computing device and a means for repositioning the content in virtual space based upon the sensed tilt. The means for sensing a movement in real space may include a means for receiving a digital image from a camera, a means for comparing at least a portion of the received digital image to at least a portion of a previous digital image to identify a change in sequential images, and a means for determining a movement based upon the identified change in the sequential images. The means for determining the viewing perspective of the content treated as fixed in virtual space may also make the determination based upon a virtual movement scaling factor applied to the determined change in position of the mobile computing device. The mobile computing device may further include a means for receiving a user interface mode selection input (which may be in the form of a button press) while in a graphical user interface mode, a means for fixing the content in virtual space based upon a display of the content in the graphical user interface mode, and a means for implementing a mobile user interface mode as described herein, as well as a means for receiving a user interface mode selection input while in the mobile user interface mode, a means for fixing the content in the a mobile computing device display, and a means for implementing the graphical user interface mode.

In another aspect, a computer program product includes a computer-readable medium which includes at least one instruction for receiving a signal from a sensor which may be any one or more of an accelerometer, a distance measuring sensor, a tilt sensor, a camera, and a compass, at least one instruction for determining a change in position in real space of a mobile computing device based upon the receive sensor signal, at least one instruction for determining a viewing perspective of a content treated as being fixed in virtual space based upon the determined change in position of the mobile computing device; and at least one instruction for generating an image on a display of at least a portion of the content based upon the determined viewing perspective. The computer-readable medium may further include at least one instruction for receiving a signal to select a selection of the content, at least one instruction for determining a part of the content located near a center of the display, and at least one instruction for selecting the part of the content located near a center of the display. The computer-readable medium may further include at least one instruction for including a selection aid within the generated display, wherein the selection aid indicates the center of the display and/or the part of the content within the display that will be selected. The computer-readable medium may further include at least one instruction for selecting a form of the selection aid depending upon the content located near the center of the display, wherein the form of the selection aid may be, for example, crosshairs, a circle, an oval, a box, a region of enhanced brightness, a region of enhanced definition, and a region of shading. The computer-readable medium may further include at least one instruction for receiving the signal to select a selection of the content as a result of a button press. The computer-readable medium may further include at least one instruction for including a selection aid within the generated display, wherein the selection aid indicates a part of the content within the display that can be selected, at least one instruction for receiving a signal to select a selection of the content, at least one instruction for determining the part of the content located within the selection aid, and at least one instruction for performing an action on the part of the content located within the selection aid. The computer-readable medium may further include at least one instruction for sensing movement based upon the signal received from the sensor. The computer-readable medium may further include at least one instruction for determining a distance between the mobile computing device and a user, and at least one instruction for applying a magnification to the displayed portion of the content based upon the determined distance. The computer-readable medium may further include at least one instruction for repositioning the content in virtual space based upon the sensed tilt. The computer-readable medium may further include at least one instruction for receiving a digital image from the camera, at least one instruction for comparing at least a portion of the received digital image to at least a portion of a previous digital image to identify a change in sequential images, and at least one instruction for determining a movement based upon the identified change in the sequential images. The at least one instruction for determining the viewing perspective of the content treated as fixed in virtual space may include at least one instruction for determining the viewing perspective further based upon a virtual movement scaling factor applied to the determined change in position of the mobile computing device. The computer-readable medium may further include at least one instruction for receiving a user interface mode selection input while in a graphical user interface mode, at least one instruction for fixing the content in virtual space based upon a display of the content in the graphical user interface mode, and at least one instruction for implementing a mobile user interface mode. The computer-readable medium may further include at least one instruction for receiving a user interface mode selection input (which may be in the form of a button press) while in the mobile user interface mode, at least one instruction for fixing the content in the a mobile computing device display, and at least one instruction for implementing the graphical user interface mode.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 8 is a process flow diagram illustrating operations for selecting an action in a prior art user interface for personal computers and mobile computing devices.

FIG. 9 is a process flow diagram illustrating operations for selecting an action in a mobile user interface for mobile computing devices according to various aspects of the present invention.

FIGS. 18 and 19 are functional/component block diagrams of alternative mobile computing device configurations according to various aspects of the present invention.

DETAILED DESCRIPTION

Figure 1:
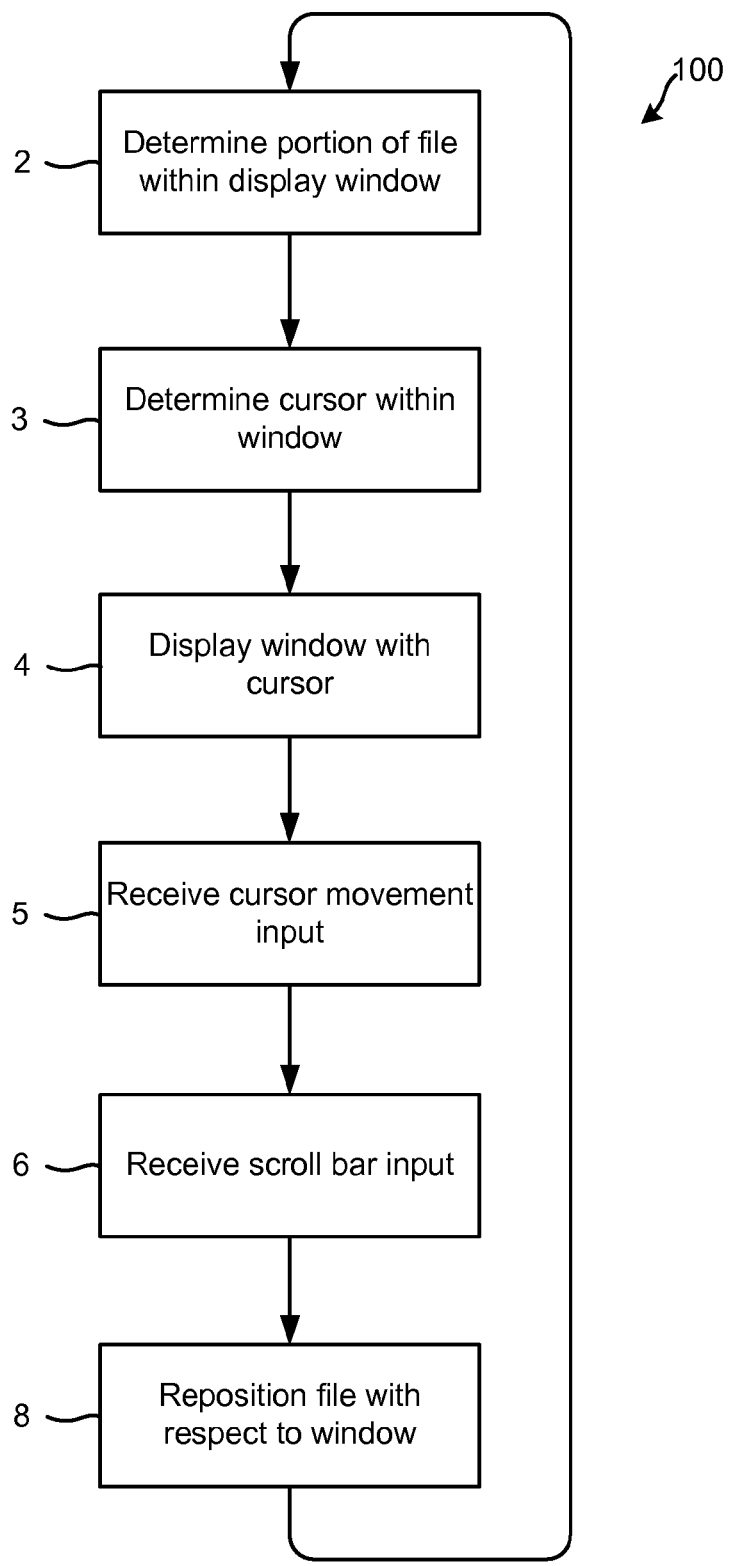
FIG. 1 is a process flow diagram illustrating basic operations of a prior art graphical user interface for personal computers and mobile computing devices.

Various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "mobile device," or "mobile computing device" refer to any one or all of cellular telephones, personal data assistants (PDA's), palm-top computers, netbook computers, notebook computers, wireless electronic mail receivers and cellular telephone receivers (e.g., the Blackberry® and Treo® devices), multimedia Internet-enabled cellular telephones, and similar handheld electronic devices which include a programmable processor or dedicated graphics processing chip, memory and a display.

As used herein, the term "user interface" refers to software processes operating on a computing device which present a series of images and menus to users and provide various interface tools to receive user inputs for interacting with the computing device or content on the computing device. The various aspects provide a user interface particularly suitable for mobile computing devices and portable computers (e.g., notebook computers). For ease of reference, the various aspects may be referred to herein or in the drawings as a "mobile user interface" ("MUI" in the drawings) to distinguish such user interfaces from traditional user interfaces originally developed for fixed computing devices (e.g., Windows® and Leopard®) which may be referred to as "graphical user interface" ("GUI" in the drawings). It is important to note that various implementations of a mobile user interface may include graphical features, tools, or icons. Therefore, the references to "mobile user interface" versus "graphical user interface" are not intended to require or imply that a mobile user interface according to the various aspects may not include graphical elements.

In a conventional graphical user interface developed for use on fixed personal computers (e.g., desktop computers), the computing device display is presumed to be fixed in real space while the document, file, or desktop is presumed to be movable in virtual space with respect to the device. The presumption of a fixed viewing window was appropriate for personal computers which historically have been large systems in which the CRT display was typically fixed to a desktop. With such a fixed display the graphical user interface was modeled on a window fixed in real space (e.g., on a wall). Exemplary processing operations of a conventional graphical user interface are illustrated in FIG. 1. At block 2 within process 100 of a conventional graphical user interface, the location of content with respect to the display and thus the portion of a document, file, or desktop that is visible within the display window is determined. At block 3 in process 100 location of a cursor within the display window is determined. This information is then used to generate a display including the cursor at block 4. At block 5 in process 100 input from a pointing device, such as keyboard keys, a computer mouse, or touch pad, provides information to the processor or dedicated graphics processing chip for repositioning the cursor within the display or selecting objects or elements within the open content. Based on such cursor movements controlled by user manipulation of pointer devices and/or keypad presses, at block 6 in process 100 the processor or dedicated graphics processing chip may receive inputs regarding movement of the file with respect to the display window, such as manipulation of scrollbars. At block 8 in process 100, a computer processor or dedicated graphics processing chip using such scrollbar (or similar) inputs can reposition the file with respect to the window, before process 100 is repeated by returning to block 2.

Personal hand-held computing and communication devices nowadays have much of the processing power of desktop computers; however their display size and resolution remain fundamental restraints. Modern desktop computer monitors typically range in size between 17" at 1440×900 (WXGA+) resolution to 22" at 1680×1050 (WSXGA+) resolution. In contrast, notebook computer displays typically range from 10.2" at 1024×768 (XGA), such as the IBM/Lenono X61, to 17" at 1440×900 (WXGA+), such as the Dell D630 and HP 6910p. Hand-held mobile computing devices have much smaller displays which are typically a couple inches in size. A list of display sizes and resolutions for selected hand-held computing devices currently on the market is provided in Table 1 below.

TABLE 1

Hand-Held Devices Display Sizes and Resolutions

| Model | Display Size | Display Resolution | Type |
|---|---|---|---|
| MWg Atom Life | 2.7" | 240 × 320 | QVGA |
| HTC S630 | 2.4" | 240 × 320 | QVGA |
| LG-SGH100 | 2.2" | 240 × 320 | QVGA |
| Nokia N80 | 2.1" | 352 × 416 | |
| Samsung P300 | 1.8" | 176 × 220 | QCIF+ |
| Nokia 5500 | 1.48" | 208 × 208 | |
| Nokia N800/N810 | | 860 × 480 | WVGA |

To better fit content (e.g., pictures) to the display size or display resolution, some mobile computing devices permit the display to present content in either portrait or landscape orientation. Some hand-held mobile computing devices detect the display orientation in response to users rotating the device and change the content orientation format to match the display orientation. Recently released mobile computing devices, such as the Blackberry Storm®, have built-in accelerometers which can sense a change in the device orientation enabling the processor or dedicated graphics processing chip to automatically adjust the content orientation. While this utility may better match the content to the dimensions of the display it does not increase the size of the content window.

To minimize the display size limitation, the size of mobile computing devices can be increased to accommodate larger displays; however, this approach can only be taken so far before the computing device is no longer "hand-held" or mobile. Increasing the display resolution can help by enabling more content to be presented within the display; however, there are limits to the size and separation of pixels that the average human eye can resolve, even on high-definition displays.

Since there are practical limits to the size and resolution of mobile computing device displays, the traditional approach has been to allow file content to be much larger than the viewing window of the display and to provide vertical and horizontal scroll bars that can be manipulated to move the file content with respect to the display. More recently, mobile computing devices have been sold which allow file content to be much larger than the viewing window (i.e., display) and enable users to reposition the file within the viewing window by dragging a stylus or finger across a touch screen display, such as the Blackberry Storm® sold by Research In Motion Ltd. These approaches are almost direct transplants of desktop graphical user interface solutions to the hand-held computing environment. As a result, graphical user interfaces employed on mobile computing devices suffer the limitations of both desktop and hand-held worlds, resulting in a desktop-like user experience on a small screen.

The known graphical user interfaces implemented on mobile computing devices are familiar to most users from desktop computer use experience; however, such solutions are not optimized for hand-held computing devices and thus cause a number of user experience issues. For one, such solutions require two hands (one to hold the device and another to manipulate the graphical user interface). For another, the small size of the display combined with the counter-intuitive presumption of moving a file within the small device makes it difficult to comprehend the entire document and can lead to users getting "lost" within large files.

The various aspects of the present invention resolve these user experience problems in hand-held computing device user interfaces by doing away with presumptions adopted from desktop computer graphical user interfaces and implementing new interface presumptions that are intuitively appropriate for hand-held devices. Specifically, the mobile user interface presume that the content is fixed in space at some distance from the user (referred to here as being fixed in "virtual space"), such as a picture on a wall or a document lying on a desk. The mobile user interface further presumes that the mobile computing device display functions in a manner similar to a magnifying glass or viewfinder of a camera that can be moved about to view different portions of the content (in contrast to the fixed "window" of conventional graphical user interfaces). These presumptions allow users to view and interact with content (e.g., applications, files, images, and documents) in a natural manner that takes advantage of the hand-held portability of mobile computing devices. The mobile user interface enables users to read text documents or view images as if they were viewing the document on a desk or on a wall using a magnifying glass to scan over the document. Moving a hand-held device from left to right to read text is more natural than the counter intuitive operation of convention graphical user interfaces in which documents must be dragged from right to left to read text. The various aspects provide a mobile user interface that frees hand-held device users from the limitations of display size and resolution, as well as enable one-handed operation that eliminates the need for pointing devices such as a mouse, touch pad, touchscreen, or arrow keys.

To enable the mobile user interface of the various aspects, movement of the mobile computing device in two dimensions (2-D) or three dimensions (3-D) is measured or estimated using one or more of a variety of motion, distance, and/or orientation sensors. Such sensors may include accelerometers, distance measuring sensors, tilt sensors, compass sensors, imaging sensors (e.g., a camera), and the like. Information received from such sensors are used by a processor or dedicated graphics processing chip in the mobile computing device to determine a relative movement of the device with respect to the content (i.e., document, file, or desktop) being displayed, which is treated as being fixed in virtual space, in order to determine the portion of the content that is displayed. Objects or portions of content can be indicated for selection by centering such portions within the display, thereby removing the need for a cursor as well as the need for pointing devices like a mouse, touch screen, or touchpad. Objects centered within the display can then be selected, such as by pressing a button or moving or tapping the device. Magnification or image size can be manipulated by moving the mobile computing device away from or towards the user. Content viewing may be enabled in 3-D by sensing the tilt or orientation of the mobile computing device and presenting content that is situated below or above the mobile computing device in 3-D virtual space. The content viewed or manipulated by such a mobile user interface may be obtained from local storage, such as in the case of video playback, or from external sources such as may be delivered via an air interface (for example) as in the case of web browsing or video streaming.

Figure 2:
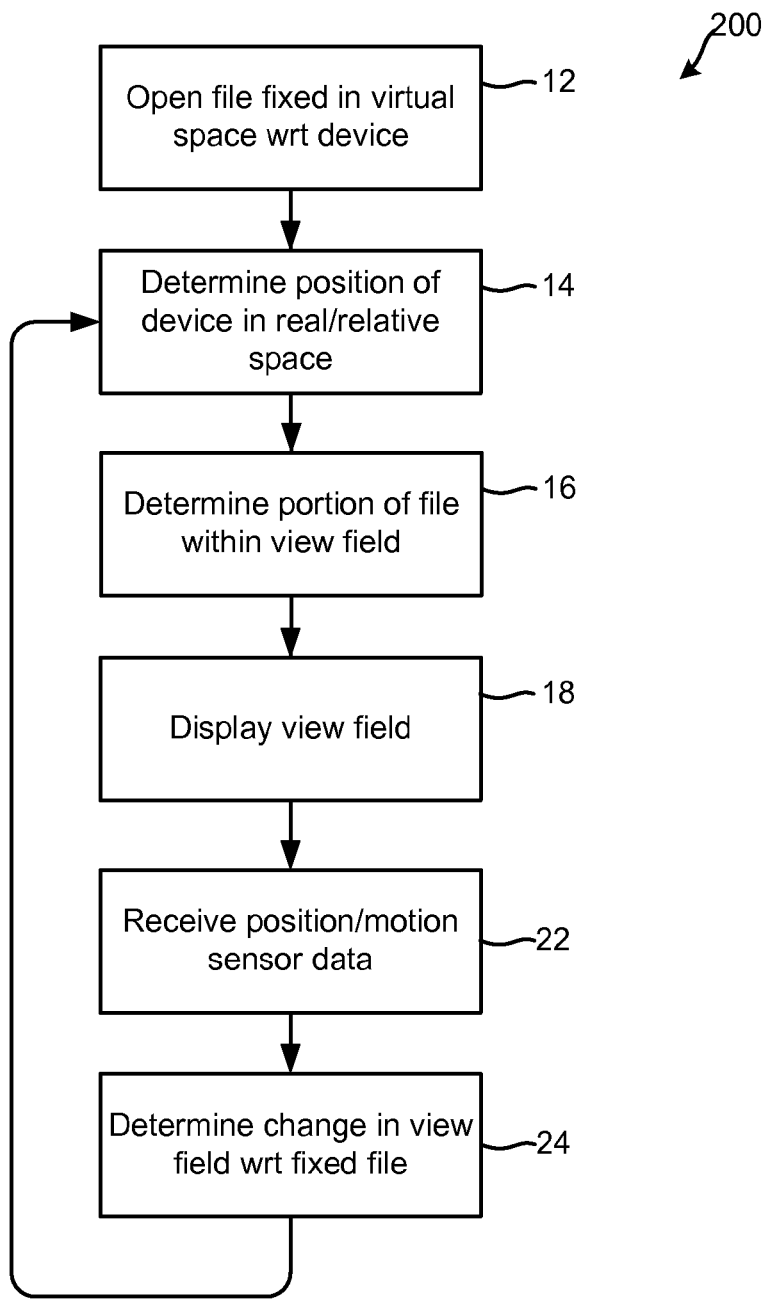
FIG. 2 is a process flow diagram illustrating some of the basic operations of a mobile user interface for mobile computing devices according to various aspects of the present invention.

FIG. 2 illustrates in process 200 basic operations that may be implemented in various aspects of the present invention. At block 12 in process 200, when a content, such as a document, file, or desktop, is opened in the mobile user interface, the content is treated by the processor or a dedicated graphics processing chip as being fixed in virtual space with respect to the mobile computing device. In this operation, when the content is opened, it may be fixed at a preset distance from the mobile computing device (and thus the user) at a preset orientation, irrespective of the real position and orientation of the mobile computing device. Thus, whenever a document or file is opened, it may appear at the same relative position with respect to the mobile computing device and the user.

At block 14 in process 200 a processor of the mobile computing device may then determine the position of the device in real space. The determination of the position in real space may be made in terms of absolute coordinates with respect to a fixed coordinate system (e.g., centered on the user) coordinates or movement with respect to an initial location (e.g., the location of the mobile computing device when the mobile user interface was activated). For example, the processor or dedicated graphics processing chip may receive distance measurements to nearby surfaces and from this information define a coordinate system centered on the user or within a room or volume (e.g., a car) within which the device's position can be identified in three dimensions. Alternatively, the processor or dedicated graphics processing chip may track the movement in real space of the mobile computing devices from a starting point and define its position in 3-D space in terms of distance from that starting point regardless of where the starting point was with respect to the user or a room. In some implementations, the mobile computing device may measure its position in real space using distance measuring and orientation measuring sensors. In other implementations, only motion or acceleration may be measured and position and orientation may be estimated with respect to the starting position of the device at the time that the file was opened fixed in virtual space (i.e., at block 12 or process 200).

At block 16 in process 200, a processor in the mobile computing device determines the portion of the content that is within the view field of the display based upon the determined or presumed starting position of the mobile computing device and the fixed position in virtual space of the open content. This operation may determine the viewing perspective of the display and magnification to be applied to the content to identify the corresponding portion of the open content. This operation may be accomplished using any of a variety of known graphic or vector processing algorithms. At block 18 in process 200 a processor in the mobile computing device generates the image which is presented on the display using the determined portion of the content within the view field.

At block 22 in process 200 changes in the viewing perspective of the mobile computing device may be determined by the processor receiving position or motion sensor data. Using such data, at block 24 in process 200 the mobile computing device can determine a change in the view field with respect to the content fixed in virtual space. As discussed in more detail below with reference to FIGS. 10 through 14, a variety of position, motion, and orientation sensors may be used to determine the relative position or movement of the mobile computing device in block 22 of process 200. The sensor information may be utilized to determine a change in the position or viewing angle of the mobile computing device in block 24 of process 200, which is then used to determine a new position of the mobile computing device in real space, returning to block 14 of process 200. Alternatively, the sensor data received in block 22 may be used to determine a new position of the device in real space, returning to block 14. Then, with a new position of the mobile computing device determined, the processes of determining the viewed portion of the content in block 16, and displaying that content at block 18, are repeated.

Blocks 14 through 24 of process 200 (determining mobile computing device movement or position, and displaying the appropriate portion of the content) may be repeated continuously. The repetition rate may have a frequent periodicity in order to provide a seamless mobile user interface that functions, much like a video camera view finder display. The correlation between movement of the mobile computing device in real space and changes in viewing perspective of the open content in virtual space may be one-to-one or some other proportion in order to provide a better user experience. For ease of reference, this correlation between the movement of the mobile computing device in real space and changes in viewing perspective are referred to herein as a "virtual movement scaling factor." The virtual movement scaling factor is a factor applied by the mobile computing device to determine the distance that the display appears to move across the open content in virtual space for a given movement in real space. The virtual movement scaling factor may be one-to-one so a one foot movement in real space results in a one foot movement of the displayed content, less than one-to-one so that a one foot movement in real space results in less than a foot movement of the displayed content, or more than one-to-one so that a one foot movement in real space results in more than a foot movement of the displayed content. For example, normal jitter and random movements of a user's hand holding a mobile computing device could result in a disturbing display image if such movements were directly implemented as display changes.

A more pleasing display may be generated by changing the viewing perspective at a rate that is less than the measured movement of the mobile computing device (less than a one-to-one correlation), such as correlating a 3-inch horizontal movement of the mobile computing device to a 2-inch change in the viewing perspective of the open content. In one aspect, mobile computing device movement may be mitigated by implementing hand-jitter reduction (HJR) or digital image stabilization (DIS) technologies similar to those implement in digital imaging systems (e.g., cameras and video cameras). In one aspect, the change in viewing perspective may be greater than the sensed movement of the mobile computing device (i.e., greater than a one-to-one movement correlation), which can enable users to quickly scan large content (such as large high definition images) with relatively modest movement of the mobile computing device. When TV-Out is utilized to view document on an external large screen based on a mobile UI (MUI) in the mobile computing device, the usage will be similar given that the screen size/resolution can be bigger than the document itself.

In a further aspect, the correlation between real-world movements of the mobile computing device and changes in the viewing perspective may be adjusted by users, such as in response to a button press or slide actuation or the rate of acceleration of the device in real space. In an aspect, at block 24 of process 200 the operation of determining a change in the viewing perspective based upon sensor data may test sensor data against threshold values so that if sensor values are below a present threshold no change in the viewing perspective is determined. By employing such sensitivity thresholds, annoying changes in the display due to inadvertent small movements of the mobile computing device may be eliminated. Thus, when viewing a display in a moving car, the display may not be affected by the vibrations and bumps associated with vehicle travel motion. On the other hand, to ensure that the displayed image appears steady and fixed in virtual space even as mobile computing device moves rapidly about, the mobile user interface may be configured to be very sensitive to device movements. This configuration may provide a more pleasing user experience when the mobile computing device is being used in a moving vehicle experiencing a bumpy ride, such as a car or airplane. In a further aspect, HJR and DIS technologies may be employed to aid in stabilizing the displayed image as an additional tool or alternative approach.

Figure 3:
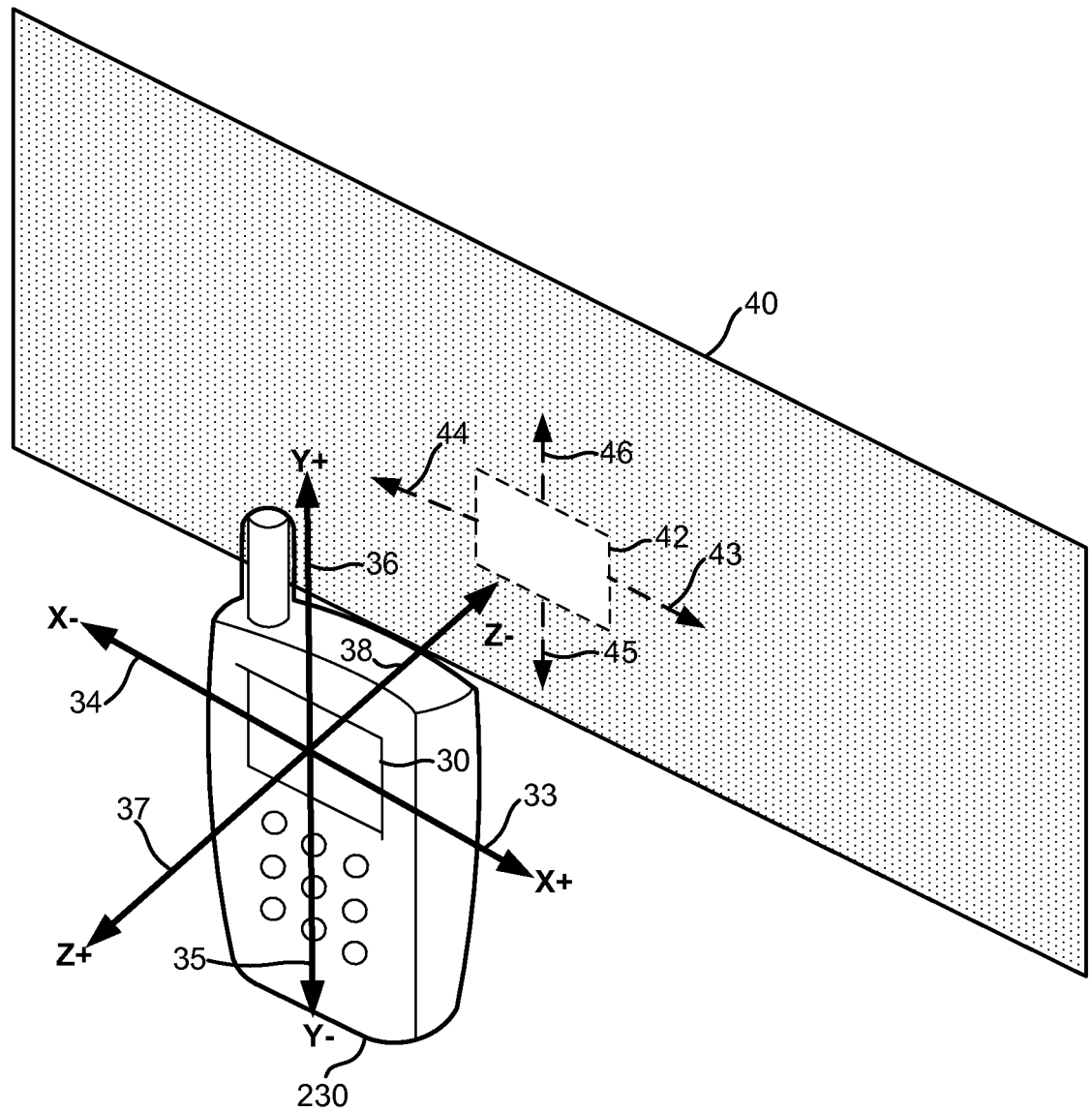
FIG. 3 is a perspective diagram illustrating a document positioned in virtual space relative to a mobile computing device in real space.

The presumptions underpinning the mobile user interface are illustrated in FIG. 3. This figure illustrates how content 40 is presumed to be fixed in virtual space and viewed through the perspective of a display 30 of a mobile computing device 230 as if looking through the viewfinder display of a video camera. Motion, position, and/or orientation sensors in the mobile computing device 230 can be used by a processor or dedicated graphics processing chip to determine position or motion within real space in three dimensions, represented in FIG. 3 by the vectors "X+" 33, "X−" 34, "Y+" 36, "Y−" 35, "Z+" 37, and "Z−" 38. The position or movement of the mobile computing device 230 is used by the device processor or dedicated graphics processing chip to determine the viewed portion 42 of the content 40 that should be presented on the display 30. The viewed portion 42 depends upon the size of the display 30, a magnification applied to the content 40 (which may be determined based upon the position in space along the Z dimension 37, 38), and the viewing angle or position in X 33, 34 and Y 35, 36 space. For example, movement of the mobile computing device 230 in the X− 34 direction may be translated into a movement of the viewed portion 42 of the content 40 in a parallel direction 44. As mentioned above, movement of the viewed portion 42 within the open content 40 may be equal to, less than, or greater than movements of the mobile computing device in real space, with such correlation being user adjustable and/or content dependent.

Figure 4:
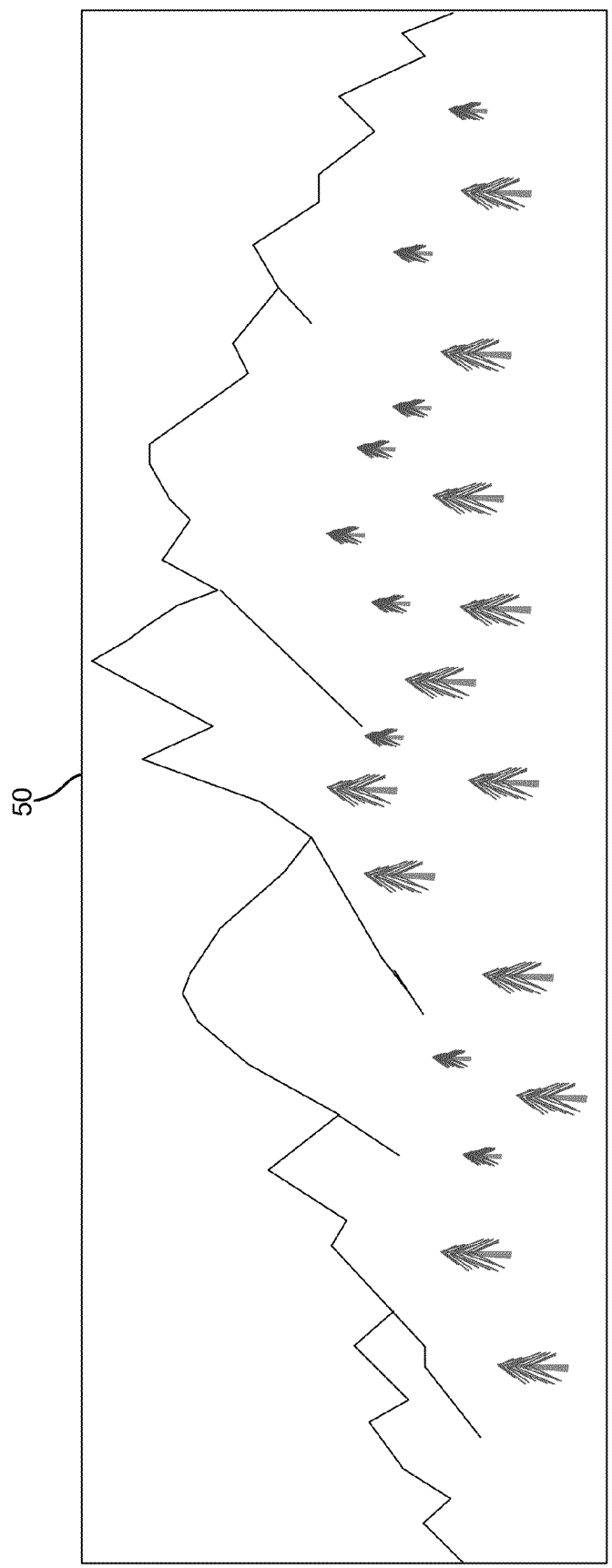
FIG. 4 is an illustration an example image document.
Figure 5:
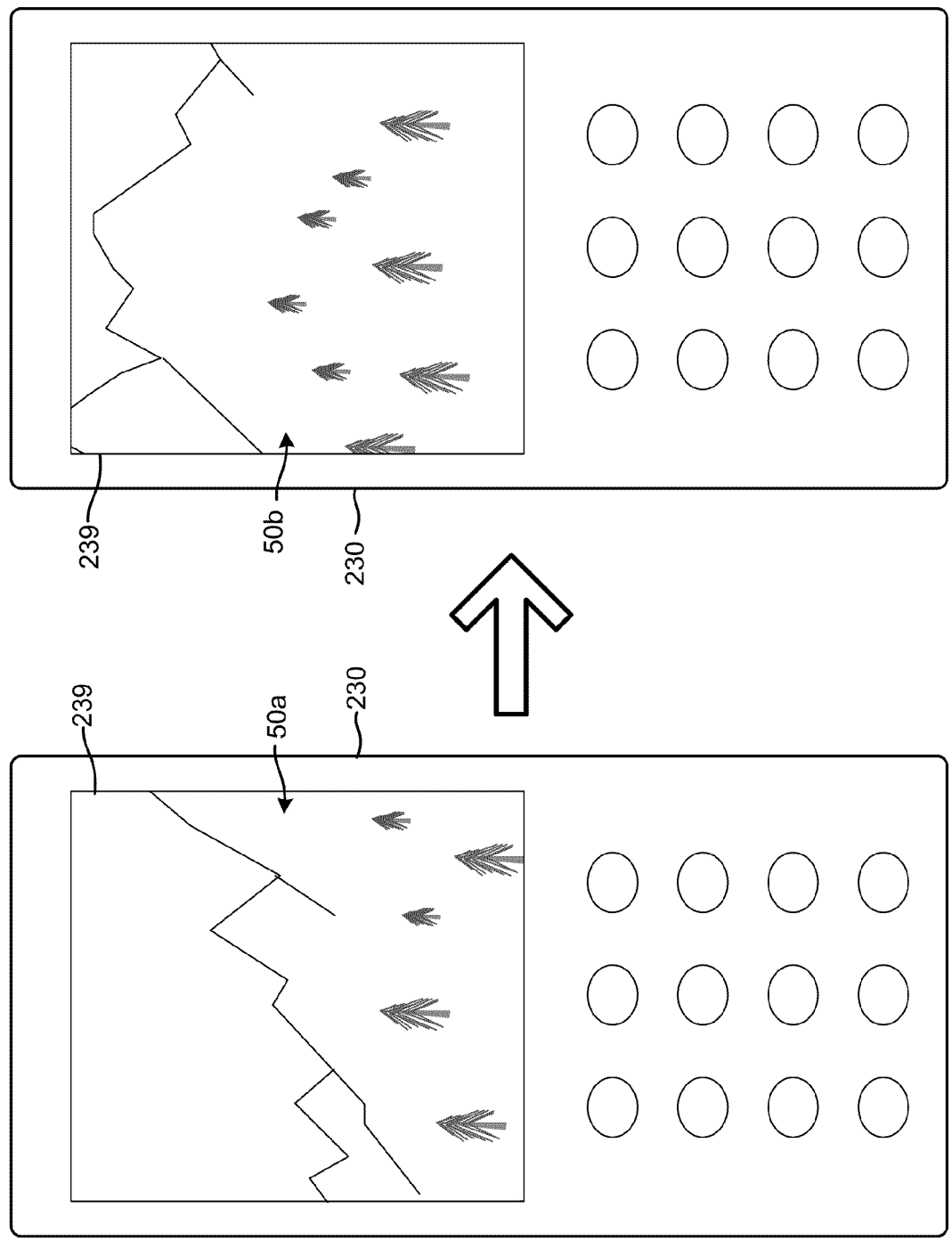
FIGS. 5A and 5B are frontal views of a mobile computing device illustrating operation of the mobile user interface for viewing the example image document illustrated in FIG. 4.

Operation of the mobile user interface may be understood with reference to the example illustrated in FIGS. 4, 5A, and 5B. FIG. 4 illustrates an image 50, such as a digital photograph file, that is to be displayed on the mobile computing device display. Since the dimensional size of the image 50 is much greater than that of the display 239 on a typical mobile computing device 230, displaying the image requires either reducing the size of the image to fit the display, or presenting a portion of the image 50 which fits within the display 239. To determine the proportion of the image 50 to be displayed, the mobile user interface determines the position and/or orientation of the mobile computing device 230 in real space, and determines from this information the image portion 50a to present on the display 239. This is illustrated in FIG. 5A which illustrates the mobile computing device 230 positioned or oriented so that the image portion 50a presented on the display 239 is centered near the left end of the image 50. When a user moves the mobile computing device 230 laterally to the right, this change in position in real space is translated by the mobile user interface into a change in the viewed as illustrated in FIG. 5B. This figure illustrates the mobile computing device 230 positioned or oriented so that the image portion 50b presented on the display 239 is centered just right of center of the image 50. Thus, as illustrated in FIGS. 5A and 5B, a user is able to scan a large image 50 simply by moving the mobile computing device 230 from side to side as if moving a magnifying glass over a photograph or scanning a telescope across a distant scene.

Figure 6:
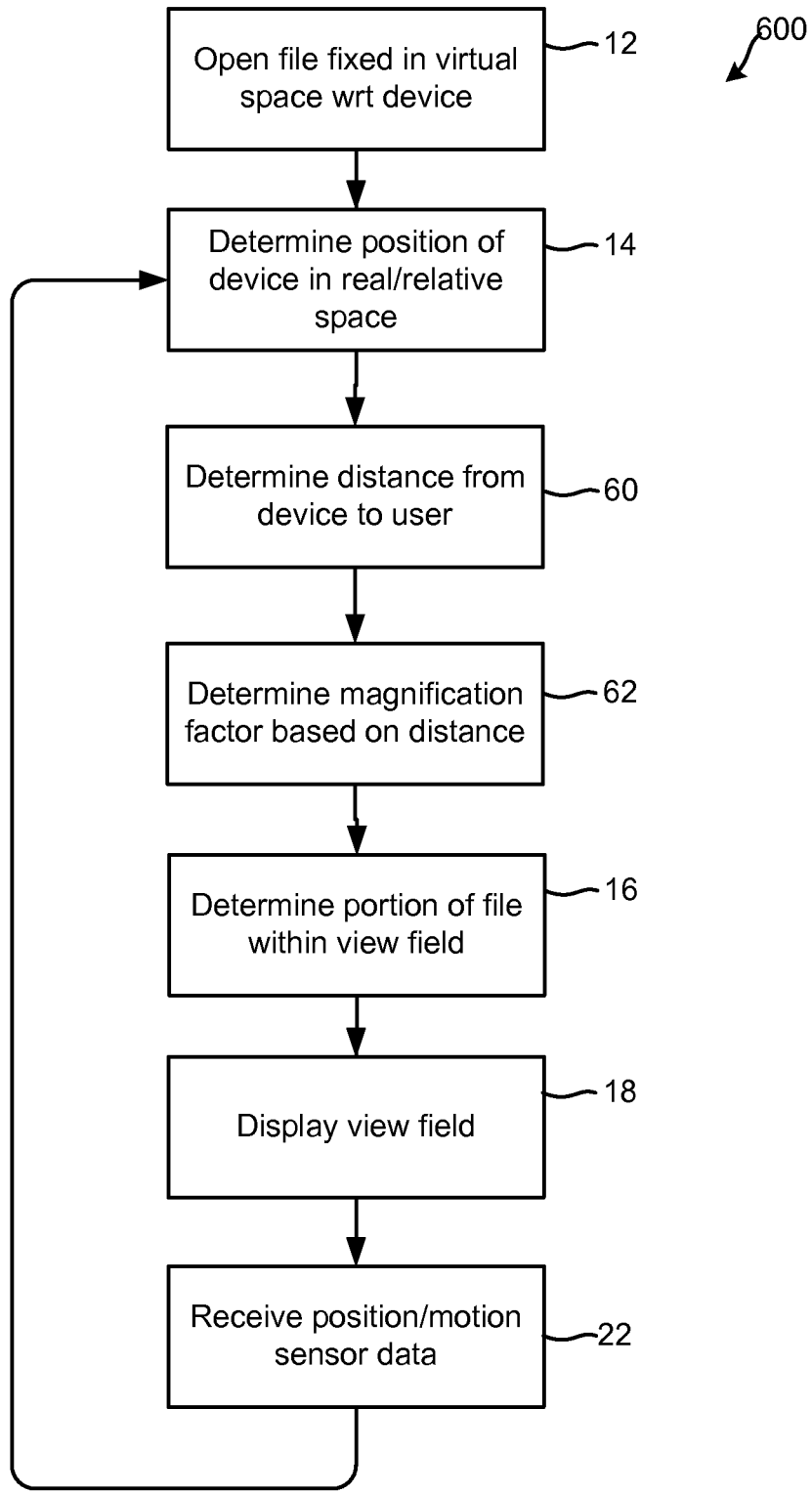
FIG. 6 is a process flow diagram illustrating operations of a mobile user interface for controlling the image size or magnification based on the position of the mobile computing device with respect to a user.

Movement of the mobile computing device 230 can also be used to control the size or magnification applied to content presented within the display 239. Example operations for accomplishing this are illustrated process 600 shown in FIG. 6. As described above with reference to FIG. 2, when content is initially opened at block 12 in process 600 it is presumed fixed in virtual space with respect to the mobile computing device 230 (and thus the user). At block 14 of process 600 the initial position of the mobile computing device 230 in real space is determined or presumed. Additionally, at block 60 of process 600 a distance between the mobile computing device 230 and the user may be determined using a variety of sensors (e.g., a camera or distance measuring sensor). This distance, along with prior content information (such as font size etc.), can be used as the baseline for determining changes in content magnification. At block 62 of process 600 the distance from the mobile computing device 230 to the user measured in block 60 can be used by a processor or dedicated graphics processing chip within the mobile computing device 230 to determine a magnification factor that should be applied to the content. Initially, when the content is first opened, the magnification made may be the preset default, such as 100%, regardless of the distance between the mobile computing device 230 and the user. Subsequently, as the mobile computing device 230 is moved towards or away from the user (i.e., along the Z axis 37, 38), the magnification factor determined based on the distance will vary from the initial value.

At block 16 of process 600 the mobile computing device 230 may determine the portion of the content that is within the viewed portion 42 based upon the determined position of the mobile computing device 230 in real space, the orientation of the mobile computing device 230, and the determined magnification factor, a processor or dedicated graphics processing chip. At block 18 of process 600 this information and the content data can be used to generate the display. At block 22 of process 600 the processor or dedicated graphics processing chip within the mobile computing device 230 receives position, motion, and/or orientation sensor data, which it can use to determine an updated position of the mobile computing device 230 in real space, returning to block 14. The information received from position, motion, and/or orientation sensors in block 22 may also be used to determine an updated distance from the mobile computing device 230 to the user in block 60. By repeating process 600 in a continuous loop that executes on a frequent periodic basis, the processor or dedicated graphics processing chip can provide a mobile user interface which seamlessly presents a portion of content within the display, reflecting the forward and backward movements of the mobile computing device 230 (i.e., along the Z axis 37, 38) in the magnification applied to the content. In an implementation, the operation of adjusting the magnification based upon the user-to-device distance may be selectively activated or deactivated by a user, such as in response to the press of a particular button or activation of a displayed icon, so that the user can choose to have content displayed at a constant magnification.

Figure 7:
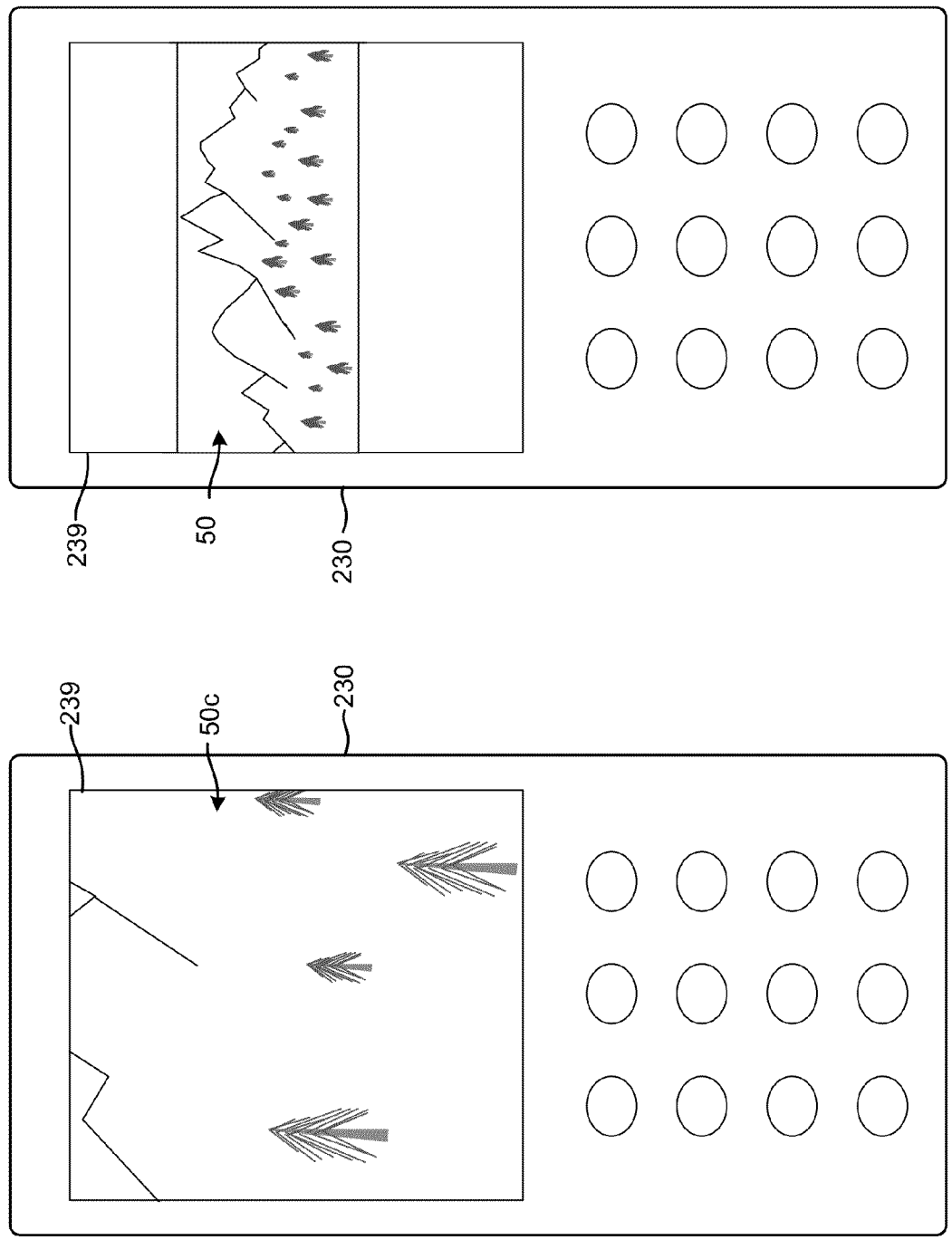
FIGS. 7A and 7B are frontal views of a mobile computing device illustrating operation of the mobile user interface providing different magnifications of the example image document illustrated in FIG. 4.

The magnification operation of the mobile user interface may be understood by reference to the example illustrated in FIGS. 7A and 7B. These figures illustrate a mobile computing device 230 in which the viewed portion of the image 50 shown in FIG. 4 is adjusted in magnification depending upon the relative distance between the mobile computing device 230 and the user (i.e., along the Z axis 37, 38). For example, FIG. 7A illustrates a situation in which the mobile computing device 230 has been brought closer to a user (i.e., along the Z axis 37, 38), resulting in a magnified viewed image portion 50c compared to the image portion 50a shown in FIG. 5A. In contrast, FIG. 7B illustrates a situation in which the mobile computing device 230 has been pushed further away from a user (i.e., along the Z axis 37, 38), resulting in a magnification which reduces the size of the image 50 so that it fits within the confines of the display 239.

Besides presenting content in a display, a user interface should also provide the capability of selecting objects or portions of a display for operations. In a conventional graphical user interface, such interactions with content are enabled by pointing devices, such as a mouse, touchscreen, or touchpad, which users can manipulate to position a cursor within the display window. As is well known, users of conventional graphical user interfaces can select an item or portions of displayed content by positioning the cursor over a desired object using a pointing device and then clicking on a button (e.g., a mouse button) or tapping the pointing device (e.g., a touchscreen or touchpad).

An overview of operations of a conventional graphical user interface is illustrated in the process 800 shown in FIG. 8. As described above with reference to FIG. 1, At block 2 of process 800 the user interface determines the position of content (e.g., a file, document, or desktop) within the display window. At block 3 of process 800 user interface determines the position of the cursor within the window. At block 4 of process 800 the user interface generates a display of the content and window with the cursor should. At any point a user may click a mouse button (e.g., the left mouse button) or tap a touchscreen or touchpad, in which case the button press informs the graphical user interface that the item within the display in the vicinity of the cursor is to be selected. At block 82 of process 800 the graphical user interface determines the content that corresponds to the portion of the display window indicated by the cursor. At block 3 of process 800 the graphical user interface activates or otherwise takes the appropriate action on that particular content. Processing can continue on to actions determined by that content or to the remaining operations of the graphical user interface. Thus, a conventional graphical user interface typically requires manipulation of the cursor with a pointing device and the operation of a selection button.

In contrast to a conventional graphical user interface, the mobile user interface does not require manipulation of a cursor, and thus does not require input from a pointing device (e.g., a mouse or touchscreen). Instead, a user can simply move the mobile computing device in space until the desired content or object is centered within the displayed field. This is illustrated in process 900 shown in FIG. 9. As described above with reference to FIG. 2, at block 14 of process 900 the processor or dedicated graphics processing chip may receive signals from position, motion, and/or orientation sensors to determine a position of the mobile computing device in real space. Using this information, at block 16 of process 800 the processor or dedicated graphics processing chip determines the portion of the content is displayed within the view field. At block 18 of process 800 the processor or dedicated graphics processing chip generates the appropriate image for presentation on the display. This process continues until the user indicates that a selection is to be made, such as by pressing a button on the mobile computing device. When this happens, at block 85 of process 800 the processor or dedicated graphics processing chip in the mobile computing device receives a signal indicating that the selection button has been pressed. Instead of a button press, selection may be indicated by a user shaking, flipping, spinning, tapping, or performing some other recognizable manipulation of the mobile computing device. This button press or manipulation essentially takes the place of a mouse-button press in a conventional graphical user interface. In response, at block 87 of process 800 the processor or dedicated graphics processing chip may determine a selection of content that is at the center of the view field (i.e., the portion of the content located at or near the center of display). The center of the view field may be a predetermined portion of the viewed field or display, such as the central 10% of the field. The shape of the content selection portion of the view field may be adjustable, such as in the form of a circle or square.

The display may include visual cues or aids to help users select portions of viewed content using a mobile user interface. For example, crosshairs, a selection box or circle or some other form of implied cursor may be presented on the display to help users position the mobile computing device so that the center of the field corresponds to the desired content. When the content that is at the center of the view field is determined, at block 89 of process 800 the processor or dedicated graphics processing chip can activate that content or take up whatever action is appropriate based upon the context of the selection or the item selected. For example, if the center of the view field includes an object for which there is a defined function, such as an icon for activating an application displayed in a homepage, then the processor or dedicated graphics processing chip may activate that file as part of the operation illustrated in block 89. Further processing may then continue with operations associated with the activated content or with the operations of the mobile user interface, including returning to block 14 of process 900 to determine a new position of the mobile computing device.

Selection aids or implied cursors provided within the display may vary in character and size depending upon the nature of the open content, the nature of available user actions and the nature of any icons or actionable graphics within the display. For example, the implied cursor may be in the form of a cross hair or gun sight (e.g., familiar from electronic games), a selection box, circle, or oval, an arrow, a pointing finger, an area of contrasting resolution (e.g., higher resolution or higher brightness), etc. Further, the type, shape, and size of the implied cursor or selection aid may be defined by the application running on the mobile computing device or displayed content to provide users with a selection tool most appropriate for the displayed content and available user actions. For example, crosshairs may not be presented when an image is being displayed unless the user has activated a selection tool (e.g., as by pressing a button). As another example, the size and shape of a box selection aid may change shape to match the size of words in a text document appearing within a display so that a user can select a word or number (e.g., for editing) by fitting it within the selection aid box. Further, the selection aid may change shape, such as to form an icon like a hand with an extended finger when an action icon appears near the center of the display to indicate that the icon can be activated. For example, if a URL appears within a document (e.g., an e-mail or SMS message), an implied cursor in the form of a hand with an extended finger may appear when the URL is centered in the display to indicate that the user can access a website at that URL address by pressing a button, flipping the mobile computing device, or performing some other activation action. In this manner, the selection aid provided in the display of the mobile user interface may behave in a manner similar to those used in conventional cursors in a graphical user interface. Also, such implied cursors or selection aids may be switched off by a user or not displayed when no selection is available to avoid distracting the user and cluttering the display.

Figure 10A:
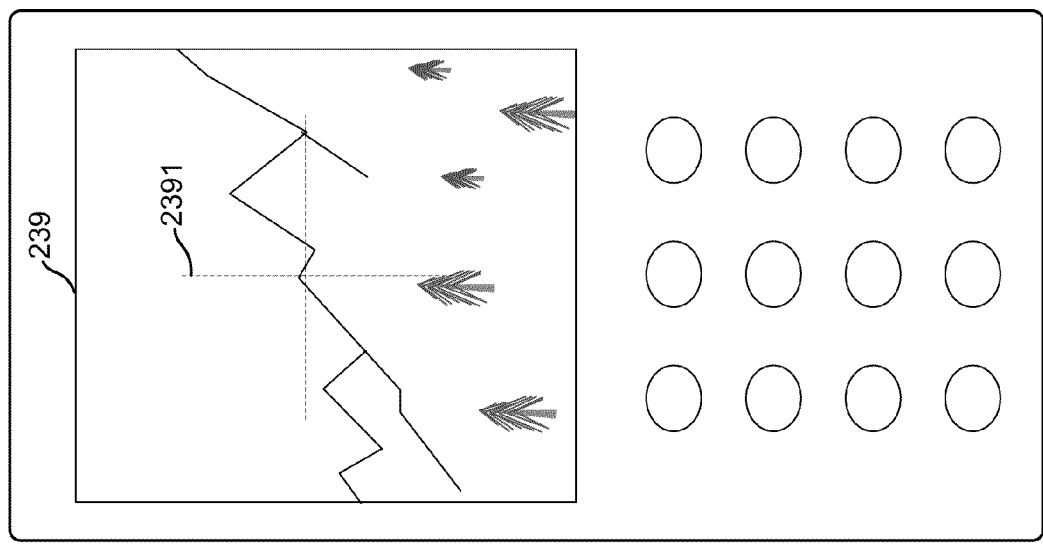
FIGS. 10A-10F are frontal views of a mobile computing device illustrating example selection aids within the display of a mobile user interface.
Figure 10B:
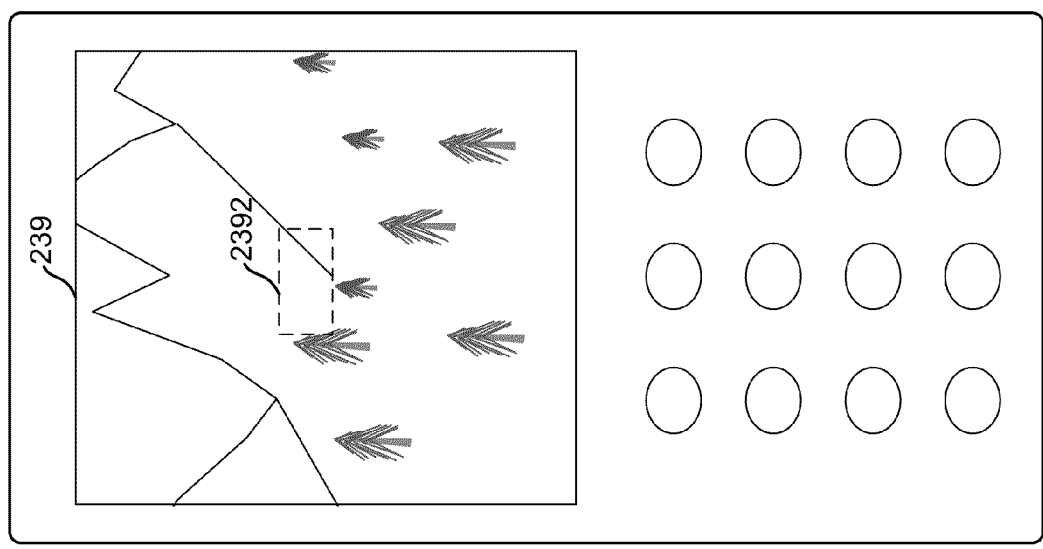
Figure 10C:
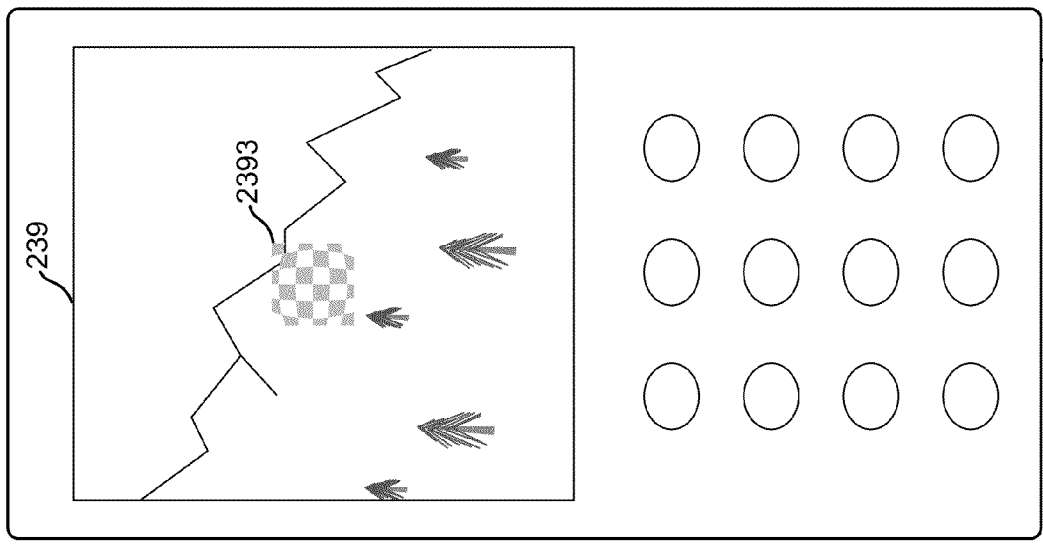

Some examples of selection aids or implied cursors that may be implemented are illustrated in FIGS. 10A-10F. As illustrated in FIG. 10A, the selection aid may be in the form of a crosshairs 2391 which identify the center point of the display 239. This form of selection aid may be useful when the user is able to select a precise portion of the display, such as to draw a portion of the display for copying or deletion or for drawing a line or other figure. As illustrated in FIG. 10B, the selection aid may be in the form of a circle, oval, or box 2392 which identify the center portion of the display 239. The type of selection aid illustrated in FIG. 2392 may be appropriate for selecting an object or icon which may be anywhere within the selection box 2392 to be activated. This type of selection aid may also be useful for selecting text or numbers which fit within the selection box 2392. As illustrated in FIG. 10C, the selection aid may be in the form of enhanced resolution or enhanced brightness, shading, or other image feature 2393 which identify the center volume of the display 239. Such selection aids may enable useful where graphic features (e.g., crosshairs 2391 or boxes 2392) would clutter the display.

Figure 10F:
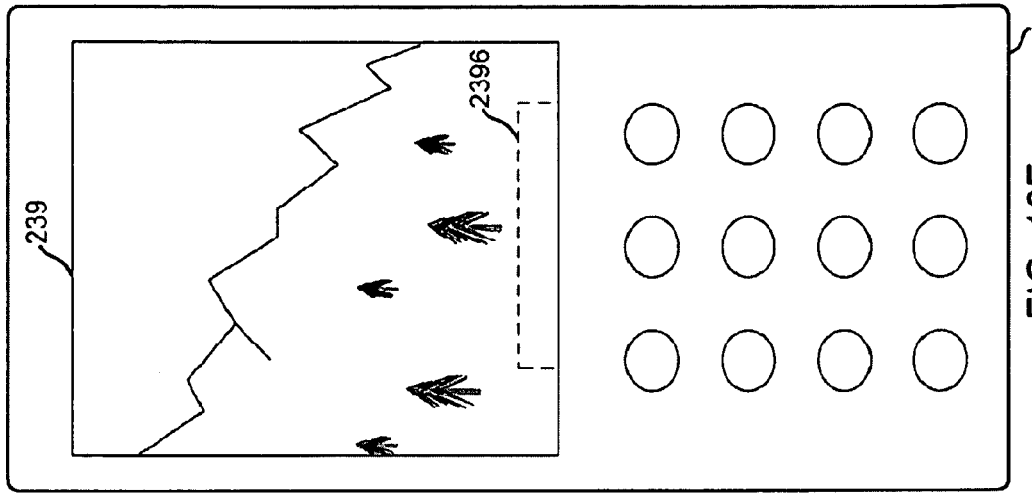
Figure 10E:
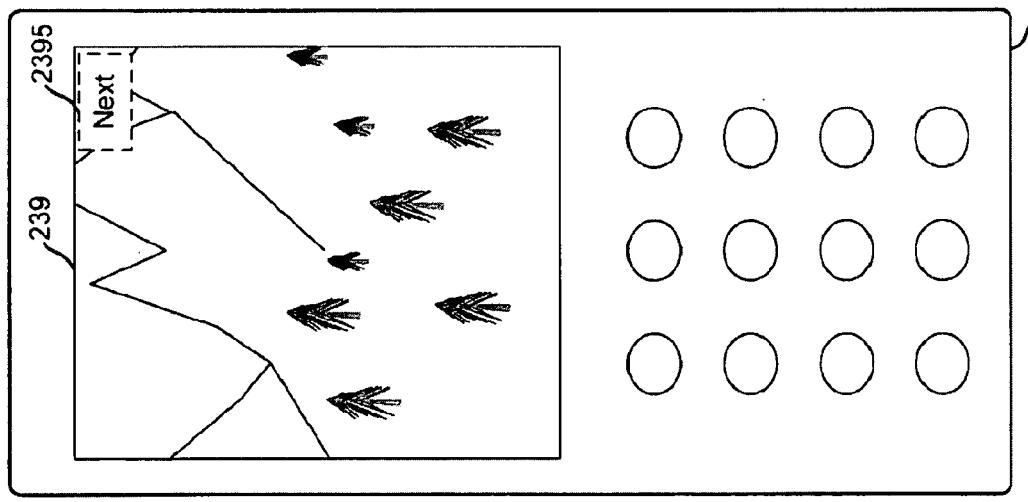
Figure 10D:
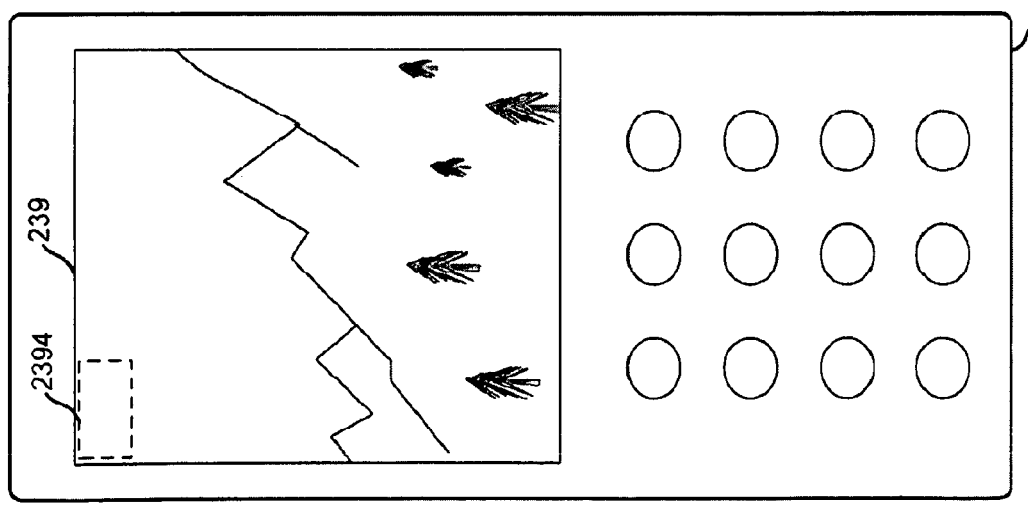

While the foregoing description and FIGS. 10A-10C describe and show the selection aid indicating the center of the display, such selection aids may be positioned at any location within the display, such as one of the four corners of the display as illustrated in FIGS. 10D and 10E, or near one edge as illustrated in FIG. 10F. Providing a selection aid in a portion of the display displaced from the center portion may be advantageous in some applications or content, such as where a centered aid would clutter the image or when menu icons are positioned along one side or near corners of the open content. For example, a selection aid box 2394 positioned in a corner of the display 239 as illustrated in FIG. 10D will keep the center portion of the display clear of clutter. As another example, by placing the selection aid in a location removed from the center, the selection aid box 2395 can include menu options (e.g., "Next") which are presented on top of the content (i.e., obscuring the underlying content) as illustrated in FIG. 10E. This implementation may enable the display of specific menu or function options appropriate for the content appearing in the center of the display (e.g., "Next" when presenting pictures in a slide show). Further, the selection aids need not be restricted to the corners of the display, and instead may be presented in other locations based upon human factors and user interface functionality considerations, such as an elongated selection aid box 2396 along the bottom of the display as illustrated in FIG. 10F for selecting menus or icons arranged along the bottom of the content (e.g., implemented in the Apple Inc. Leopard® operating system).

The content identification and selection capabilities of the mobile user interface illustrated in FIG. 9 can improve the user experience in many situations. Unlike conventional graphical user interfaces which require two hands to operate (i.e., one hand to hold the mobile computing device and a second to manipulate the pointing device), the graphical user interface enables a user to select content purely by moving the mobile computing device in space until the desired content is centered in the view field. Thus, operation of the mobile user interface and selection of content can be accomplished with one hand. Since the user can usually press a key with the same hand that is holding the mobile computing device, particularly when the key is located on the side of the mobile computing device, the process of centering the display on the desired object and activating a selection button can be accomplished with one hand. This simplified selection and activation operation may be particularly useful in mobile computing devices in many user situations.

Figure 11:
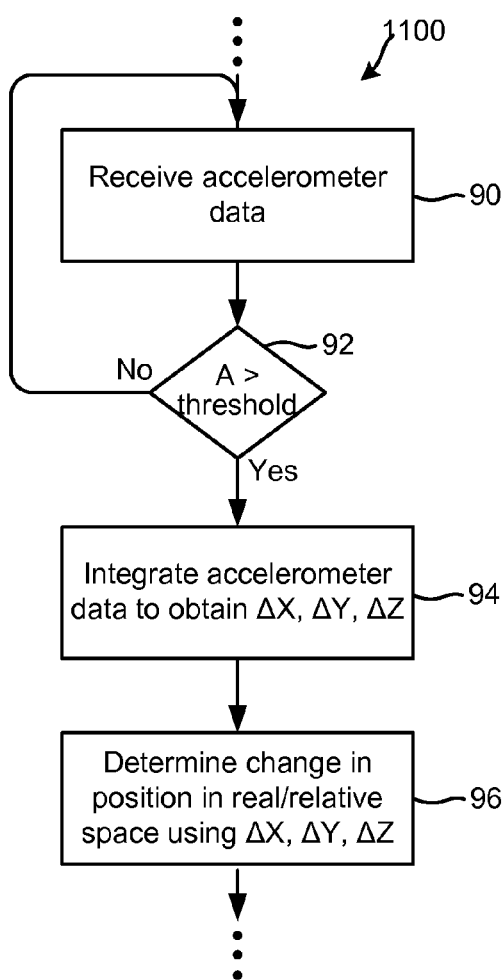
FIG. 11 is a process flow diagram illustrating operations for sensing movement and determining a change in relative position of a mobile computing device based on information received from accelerometer sensors.

As mentioned above, a number of different motion, position, and/or orientation sensors may be implemented within a mobile computing device to support the mobile user interface. For example, FIG. 11 illustrates process 1100 that may be implemented to utilize accelerometers for determining a position of the mobile computing device relative to some initial starting position in space. As part of receiving position/motion sensor data (block 22 in FIG. 2), at block 90 of process 1100 a processor or dedicated graphics processing chip of a mobile computing device can receive accelerometer data from accelerometers within the mobile computing device. Accelerometers are known electronic components which sense acceleration along an axis and output a signal which indicates a magnitude of the measured acceleration. Since it may be desirable to ignore minor movements of a mobile computing device (such as may be caused by unintentional movements of a user's hand), at decision block 92 of process 1100 the received accelerometer data may be compared to a pre-determined threshold value so that accelerations less than the threshold value can be ignored. This optional comparison of measured acceleration to a threshold value may serve to prevent the content from appearing to change position within the display in response to minor shaking or drifting of the user's hand, thereby providing a stable image-plus-device for the eye to focus upon. On the other hand, this optional comparison may not be implemented or may be deactivated by a user so that the displayed content appears fixed even while the user's hand and the mobile computing device bounce around in space (as may occur in a moving vehicle). Deactivating this feature may provide a more stable image that the eye can focus upon even as the mobile computing device moves about randomly. User's preference for either operating mode may depend upon the content and the user's circumstances.

If the accelerometer data exceeds the threshold (i.e., decision block 92="Yes"), at block 94 of process 1100 the processor or dedicated graphics processing chip can integrate the data over a time interval. At block 96 of process 1100 the processor or dedicated graphics processing chip can use the results of this calculation to determine a change of position in real space. From basic physics it is known that the change in position $\Delta X$ over an interval of time can be determined from the equation $$\Delta X_t = 1/2 A t^2 + V_0 t$$

where:

$\Delta X_t$ is the change in position within interval duration t;

A is the acceleration as measured by the accelerometer; and $V_0$ is the velocity before the start of duration t, which can be determined in the previous interval from the equation: $V_0 = At + V_i$.

To measure movement in three dimensions (i.e., along the X, Y, and Z axes), the mobile computing device 230 may include three (or more) accelerometers positioned and configured to measure acceleration along the three orthogonal directions. Thus, the processor or dedicated graphics processing chip may integrate accelerometer readings in each of three dimensions in block 94 to determine the change in position in real space in three dimensions. An accelerometer may also be used to determine a tilt angle of the mobile computing device 230 with respect to the gravity vector by measuring the force of gravity. Processing of the mobile user interface can then proceed as described above with reference to FIG. 2 and FIG. 9.

Figure 12:
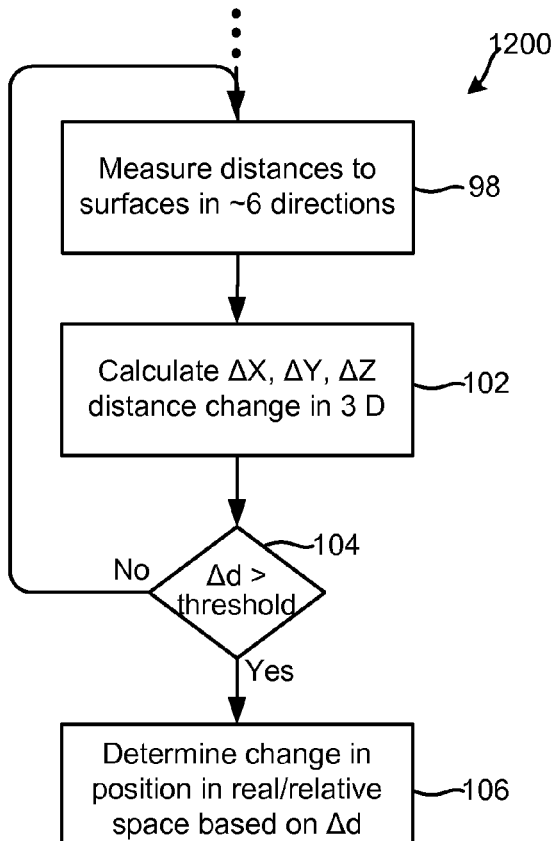
FIG. 12 is a process flow diagram illustrating operations for sensing movement and determining a change in relative position of a mobile computing device based on information received from distance measuring sensors.

Position information in real space can be determined based upon the measured distances to other objects by using measurement data obtained from distance measuring sensors. FIG. 12 illustrates process 1200 that may be implemented to utilize distance measuring sensors for determining a position of the mobile computing device 230 in real space. As part of receiving position/motion sensor data (block 22 in FIG. 2), at block 98 of process 1200 a processor or dedicated graphics processing chip of a mobile computing device 230 can receive distance measurement data from distance measuring sensors within the mobile computing device 230. Any known distance measuring sensor may be used in the mobile computing device 230, such as for example, ultrasonic ranging sensors, radio frequency ranging sensors (e.g., radar), optical sensors, and infrared sensors. For example, many late-model automobiles include distance sensors in bumpers which utilize ultrasound to determine the distance to nearby objects based upon the time between an emitted pulse and a received echo. Such ultrasound distance measuring sensors can be configured to be small enough to fit on the sides of a mobile computing device 230 without adding unnecessary bulk or weight. Similarly, small radar or optical ranging sensors may become available in sizes and forms that can be used on mobile computing devices.

Another form of distance measuring sensor utilizes markers, beacons, or signal emitters that may be placed on other objects (e.g., the user's clothing or glasses) that sensors in the mobile computing device 230 can track to determine distance by time delay measurements or triangulation. For example, light emitters, such as infrared light emitting diodes (LED) may be positioned in various locations within a room or volume (e.g., a car) or on a user (e.g., on the shoulders and collar of a user's clothing) to emit light that can be detected by light sensors on the mobile computing device 230. By sensing the angle of incident light received (or other geometric measurements) the processor or dedicated graphics processing chip can determine the distance and orientation to the user based on spherical triangulation calculations.

Similarly, ultrasound pulse emitters may be positioned in various locations within a room or volume or on the user to emit ultrasound pulses that can be received by an ultrasound sensor on the mobile computing device 230. By noting the pulse phase or time delay (or other measurements) a processor or dedicated graphics processing chip can determine the distance and orientation to the user based on spherical triangulation calculations.

In an implementation, such external emitters or beacons may be provided as detachable items on the mobile computing device 230 which users can detach form the mobile computing device 230 and position around them as appropriate to enable the mobile computing device 230 to operate within a given area. Any form of compact distance measuring sensor known or that will be developed may be used for the purposes described herein.

In an example implementation, six or more distance measuring sensors may be implemented on a mobile computing device 230 in order to measure distances in all directions, including distances from the front, back, sides, top, and bottom. So oriented, the distance measuring sensors can measure the distance from the mobile computing device 230 to nearby surfaces in each of the six directions. For example, when a mobile computing devices being used in a car, the position sensing distance measuring sensors may measure the distance from the mobile computing device 230 to each of the windows, roof, and floor of the car, plus the distance to the user. Similarly, when a mobile computing device 230 is being used within a building, the distance measuring sensors may measure the distance to the floor, ceiling, and nearby walls.

The purpose of measuring distances to nearby surfaces is not to determine the absolute position of the mobile computing device 230 within the surrounding space, but rather to use such measurements to determine changes in position of the mobile computing device 230 over time, particularly with respect to the position of the mobile computing device 230 when content is opened. Thus, using data received from the distance measuring sensors, at block 102 of process 1200 the processor or dedicated graphics processing chip of the mobile computing device 230 can calculate a change in the distance to external surfaces in the time interval since the last set of measurements. For example, if the distance measuring sensors indicate that the distance to a nearby surface on the left side of the mobile computing device 230 has decreased by 2 inches while the distance to a nearby surface on the right side of the mobile computing device 230 has increased by 2 inches, the processor or dedicated graphics processing chip can determine that there has been a 2 inch change in position of the mobile computing device 230 in relative space.

In order to accommodate situations in which surroundings are moving independently, such as when a user is using a mobile computing device 230 in a crowd of people, the processor or dedicated graphics processing chip may average readings among opposing distance measuring sensors in order to obtain an average value. Also, the processor or dedicated graphics processing chip may be configured to ignore distance measurements which are outside a predetermined range where the distance measurements become inaccurate. For example, the processor or dedicated graphics processing chip may ignore distance measurements that are less than a few inches, since such surfaces are more likely to be associated with the user, as opposed to external surfaces. Also, the processor or dedicated graphics processing chip may be configured to ignore readings from sensors which do not indicate a distance, such as would be the case in a top distance sensor when the mobile computing device 230 is outside.

In order to accommodate normal unintentional movements of a user's hand or environmental movements such as vibrations from a car in motion, at decision block 104 of process 1200 the calculated change in distance measurements may be compared to a predetermined threshold value so that minor movements may be ignored. If the determined distance change exceeds the threshold (i.e., decision block 104="Yes"), at block 106 of process 1200 the processor or dedicated graphics processing chip may use the calculated distance change to determine a change in the position of the computing device 230 in real space. Processing of the mobile user interface can then proceed as described above with reference to FIG. 2 and FIG. 9.

Figure 13:
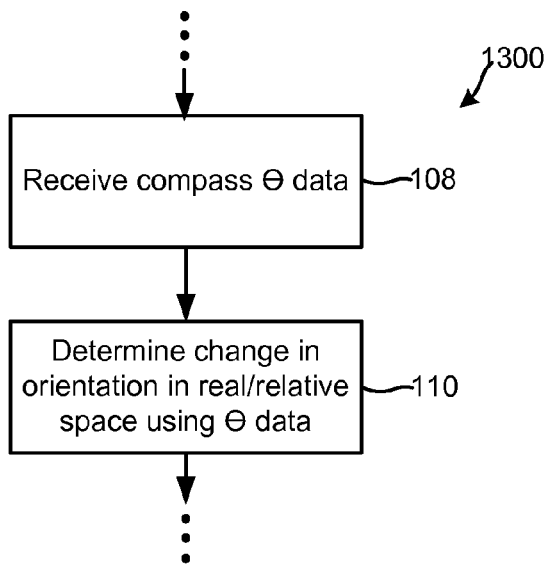
FIG. 13 is a process flow diagram illustrating operations for determining a change in orientation of a mobile computing device based on information received from a compass sensor.

Another sensor that may have useful application in mobile computing devices implementing the mobile user interface is an electronic compass. As is well known, an electronic compass can measure the orientation of the mobile computing device 230 with respect to the Earth's magnetic field, and output the result as an angle with respect to magnetic North. This compass orientation can be useful for detecting when a mobile computing device 230 is being rotated in the horizontal plane. FIG. 13 illustrates process 1300 that may be implemented as part of receiving position and motion sensor data (block 22 and FIG. 2). Specifically, at block 108 of process 1300 a processor or dedicated graphics processing chip can receive electronic compass data in the form of angle data. At block 110 of process 1300 the processor or dedicated graphics processing chip can determine a change in the orientation of the mobile computing device 230 with respect to the Earth's magnetic field at block 110. Processing of the mobile user interface can then proceed as described above with reference to FIG. 2 and FIG. 9.

Figure 14:
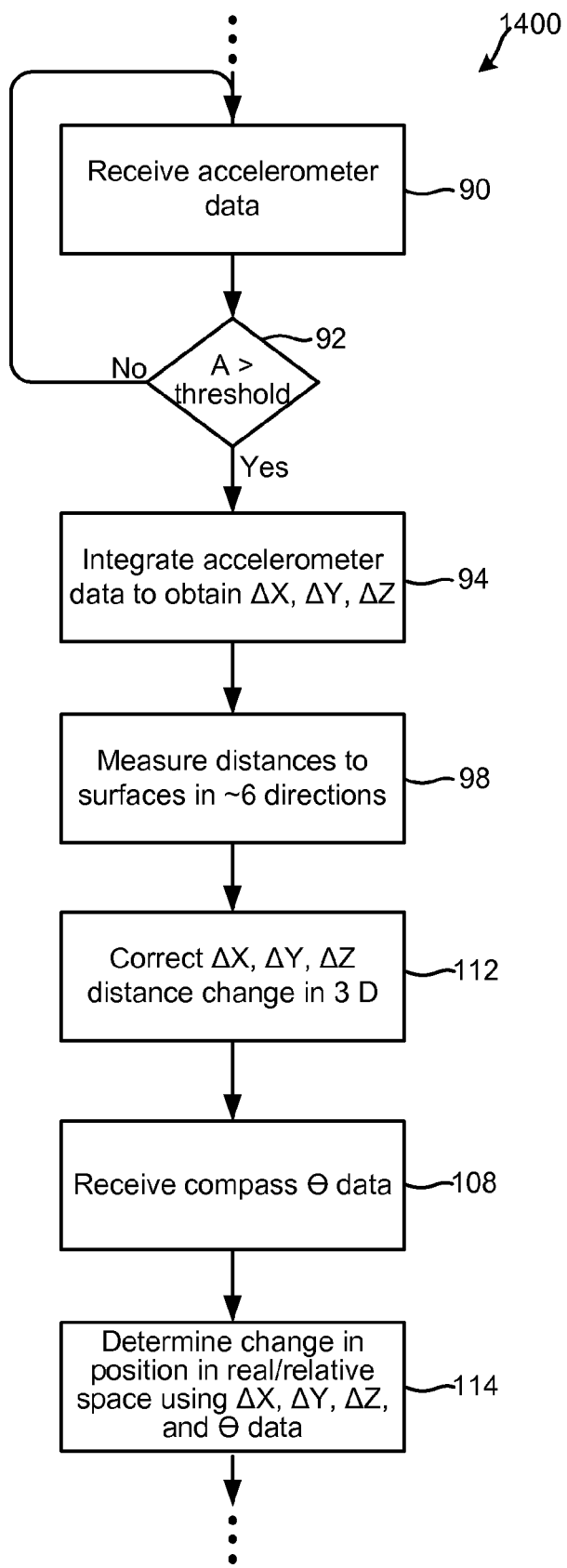
FIG. 14 is a process flow diagram illustrating operations for sensing movement and determining a change in relative position of a mobile computing device based on information received from accelerometer, distance measuring, and compass sensors.

Data from multiple kinds of motion, position, and/or orientation sensors can be combined to provide better position/orientation information for supporting the mobile user interface. For example, FIG. 14 illustrates process 1400 which may be implemented to combine data from accelerometers, distance measuring sensors, and an electronic compass to better determine changes in position and orientation of a mobile computing device 230. At block 90 of process 1400 a processor or dedicated graphics processing chip within the mobile computing device 230 can receive accelerometer data. Using this data, at decision block 92 of process 1400 the processor or dedicated graphics processing chip can compare such accelerations to a predetermined threshold value. If the measured accelerations exceed the threshold (i.e., decision block 92="Yes"), at block 94 of process 1400 the processor or dedicated graphics processing chip can integrate the accelerometer data to estimate position changes in each of the three dimensions. Additionally, at block 98 of process 1400 the processor or dedicated graphics processing chip can receive distance measurements from distance measuring sensors in six directions (for example). At block 112 of process 1400 the processor or dedicated graphics processing chip can use such distance measurements to refine the 3-D estimated position changes. By using both measured distance and integrated accelerometer data, the processor or dedicated graphics processing chip may be able to better determine changes in position of the mobile computing device 230 under a variety of conditions. For example, distance measuring sensors may experience a lag due to the speed of sound through air and the associated processing, and thus may not be responsive to quick movements of the mobile computing device 230. In contrast, accelerometers will be more responsive to quick movements of the mobile computing device 230, but will be less accurate when movements are relatively gentle (i.e., the acceleration is low). Additionally, at block 108 of process 1400 the processor or dedicated graphics processing chip can receive compass data from an electronic compass, At block 114 of process 1400 the processor or dedicated graphics processing chip can combine the compass orientation information with the changing position information determined in block 112 to determine an overall change in position and orientation of the mobile computing device 230. Processing of the mobile user interface can then proceed as described above with reference to FIG. 2 and FIG. 9.

Figure 15:
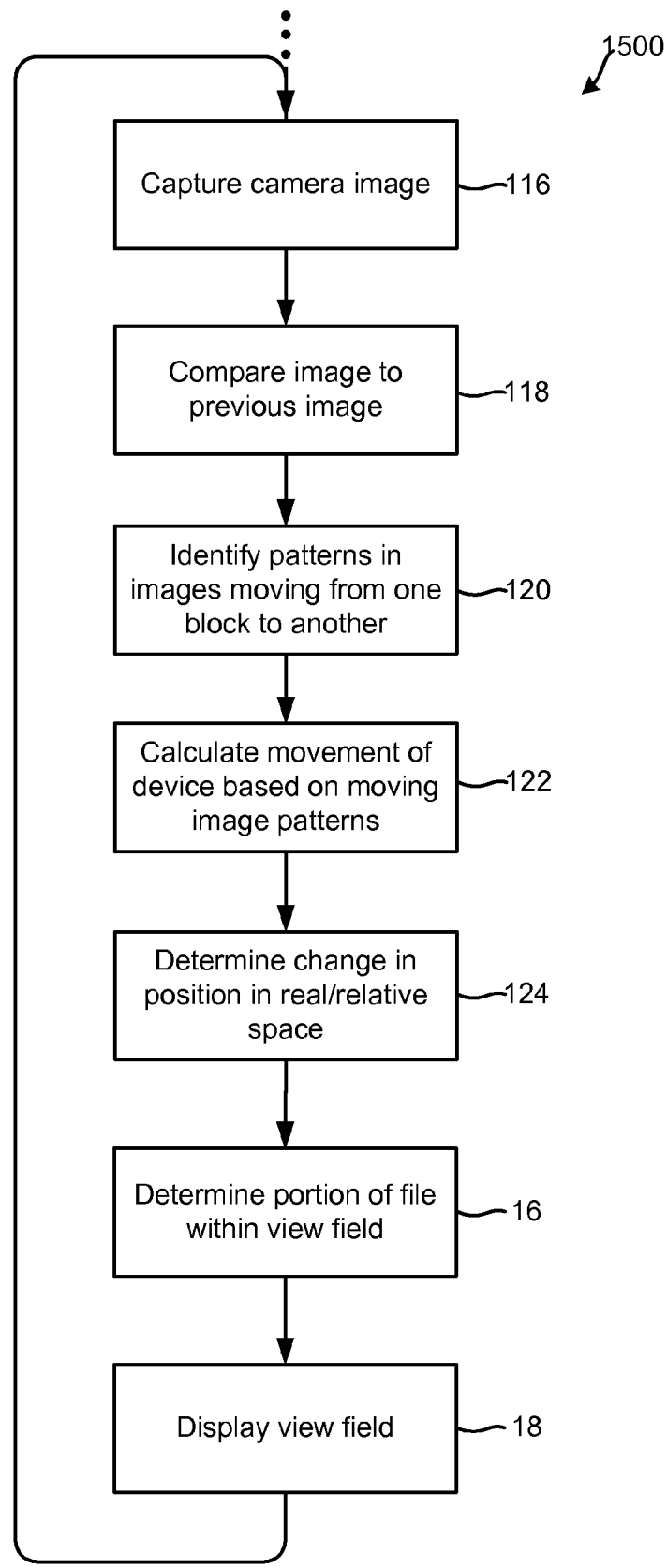
FIG. 15 is a process flow diagram illustrating operations for sensing movement, determining a change in relative position of a mobile computing device and determining a portion of a document to be viewed based on information received from a camera.

Another sensor that can be used to estimate changes in position and/or orientation of a mobile computing device 230 is a digital camera. Digital cameras are common on many mobile computing devices, and thus represent a readily available sensor that can be used to support the mobile user interface. FIG. 15 illustrates process 1500 that may be implemented to use camera data to support a mobile user interface. These operations may be performed as part of receiving position, motion, and/or orientation sensor data (see block 22 in FIG. 2). At block 116 of process 1500 digital image may be captured by the camera whenever the mobile user interface is activated. This functioning of the camera may be separate from the normal camera function typically used by users, and thus may implement different resolutions (i.e., pixel density) and/or shutter speed than in normal picture taking operations. When the camera image is captured, it may be segmented or broken down into a plurality of blocks associated with different portions of the image. Thus, the captured image may be analyzed as 4, 6, 8, or more sub-images. At block 118 of process 1500 the captured image may then be compared to a previously captured image in order to determine movement of objects between the two images. This may be accomplished at block 120 of process 1500 by identifying patterns in the various image blocks which appear to move from one block in the previous image into a different block in the captured image. By recognizing patterns within the sub-image blocks and detecting when recognized patterns shift from one block to another, a processor or dedicated graphics processing chip can estimate the movement of the mobile computing device 230 or background objects with less complex algorithms than would be required if features are recognized and tracked across the entire image. For example, if a dark feature is present in one image block in the previous image and a similar dark pattern appears in a different block in the captured image, the processor or dedicated graphics processing chip can conclude that the movement of the dark pattern from one block to the next is due to movement of the mobile computing device 230 or the item being imaged. Algorithms for determining the movement of objects within digital images based upon recognizing pattern shifts from one block to another are well-known in the image processing parts and may be utilized in the various aspects of the present invention.

Using the information obtained by comparing the captured image to previous images, at block 122 of process 1500 the processor or dedicated graphics processing chip of the mobile computing device 230 can estimate movement of the device in real space. In making this calculation, the processor or dedicated graphics processing chip may evaluate results from all blocks within the captured image and average or otherwise take into account differences in mobile computing device 230 movement indicated by the various blocks within the image. For example, changes in images may be caused by movement of the mobile computing device 230 as well as independent motions of objects within the image. Thus, movements of a particular pattern from one sub-image block to another may be due to motion of the mobile computing device 230, movement of an object in the background, or a combination of both. Various statistical methods may be utilized to determine an overall motion to be ascribed to the mobile computing device 230.

Additionally, as illustrated in FIG. 14, movement estimations from analyzing camera images may be combined with analyses of other sensor data in order to arrive at a more accurate estimation of the mobile computing device 230 movement in space. Once the movement of the mobile computing device 230 has been estimated, at block 124 of process 1500 the processor or dedicated graphics processing chip may determine the change in position of the mobile computing device 230 within real space. Using this information, at block 16 of process 1500 the processor or dedicated graphics processing chip may determine the portion of the file or content within the view field. At block 18 of process 1500 the processor or dedicated graphics processing chip may generate the appropriate display, as described more fully above with reference to FIG. 2.

Figure 16:
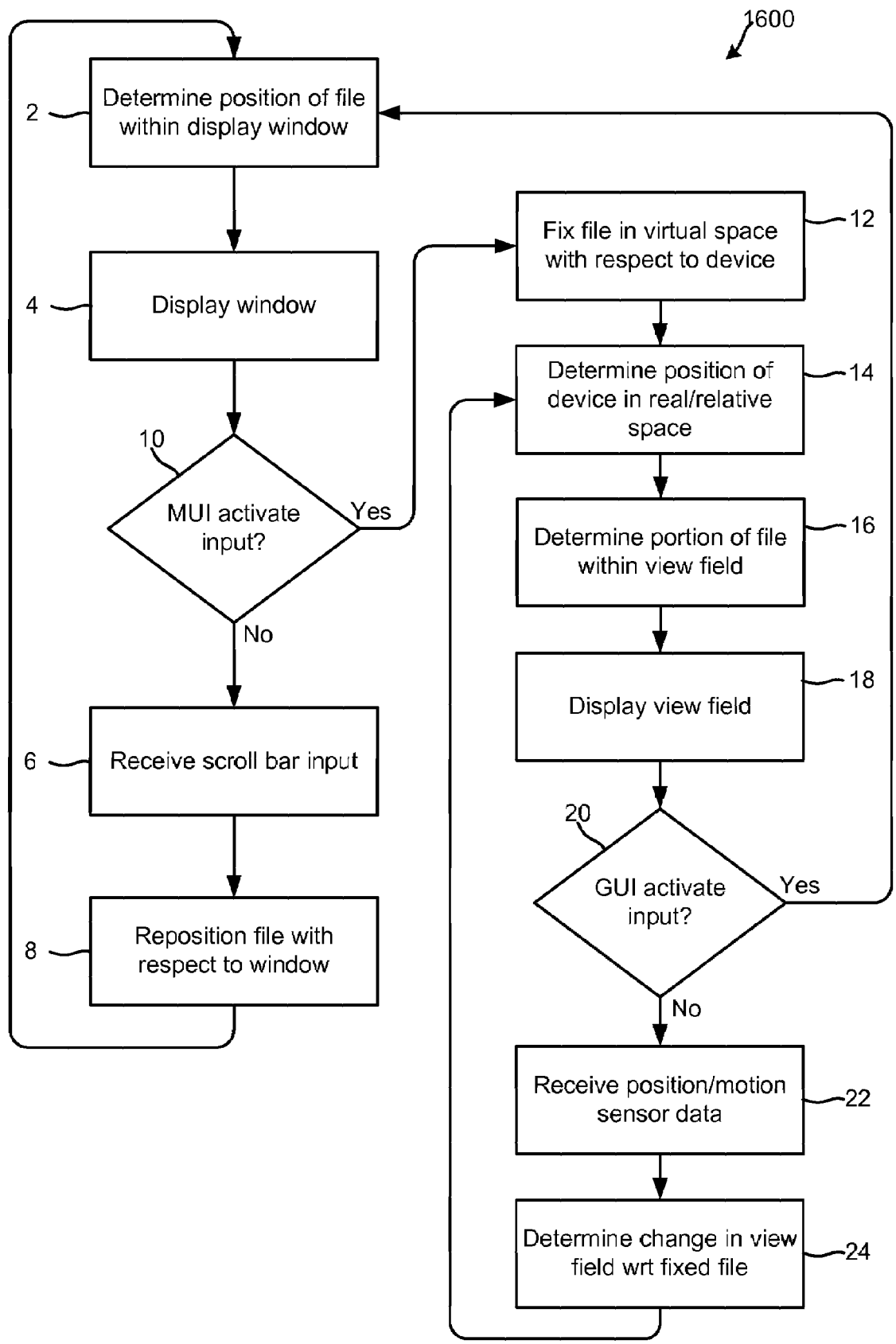
FIG. 16 is a process flow diagram illustrating operations for a user interface which includes both conventional graphical user interface and a mobile user interface functionality.

It should be appreciated that the mobile user interface described herein is not incompatible with conventional graphical user interfaces. In a particular implementation, both types of user interfaces can be implemented in the same mobile computing device 230 in order to provide a more capable user-interface. An example process 1600 involved in such a combined user interface is illustrated in FIG. 16. By combining graphical user interface capabilities with mobile user interface capabilities, a mobile computing device 230 can provide users with the ability to switch between the alternative user interfaces for viewing and manipulating content. For example, a conventional graphical user interface may be provided as a default interface which users can use in order to select content for viewing, and then switch to the mobile user interface for viewing that content.

To enable switching between user interface modes, a button or menu option may be provided on the mobile computing device 230 that users can activate to switch from one user interface mode to the other. While the mobile computing device 230 is operating in the conventional graphical user interface mode, at block 2 of process 1600 a processor or dedicated graphics processing chip of the mobile computing device 230 may determine the portion of content within the display window. At block 4 of process 1600 the processor or dedicated graphics processing chip may generate the appropriate display. At block 6 of process 1600 the processor or dedicated graphics processing chip can receive scrollbar inputs from a user. At block 8 of process 1600 the processor or dedicated graphics processing chip can reposition content within the display window as described above with reference to FIG. 1. Such conventional user interface functions may continue until a user makes an input (e.g., pressing a button) to activate the mobile user interface mode. For example, a user may utilize a conventional graphical user interface to select a particular application or file to be opened. At any point, at decision block 10 of process 1600 a mobile user interface activation input may be received. This may be in the form of an interrupt received from a button press if the mobile computing device 230 has a button dedicated to switching between user interface modes.

When the processor or dedicated graphics processing chip of the mobile computing device 230 receives a mobile user interface activation input (i.e., decision block 10 = "Yes"), at block 12 of process 1600 the processor or dedicated graphics processing chip may fix the open content (e.g., file, document, or desk top) within virtual space with respect to the mobile computing device 230 (and thus the user) as described more fully above with reference to FIG. 2. In an implementation, the open content may be fixed in virtual space so that the display does not change when the user interface mode switches. In other words, in this implementation the content is fixed in virtual space in the apparent location that it existed in the graphical user interface mode display at the instant that the mode shift is implemented.

At block 14 of process 1600 the processor or dedicated graphics processing chip of the mobile computing device 230 may determine the position of the mobile computing device 230 in real space. When the user interface mode is first switched to the mobile user interface, the processor or dedicated graphics processing chip may receive data from position, motion, and orientation sensors in order to determine an initial position/orientation of the mobile computing device 230 with respect to the open content fixed in virtual space. Based upon the determined position of the mobile computing device 230 and the fixed position in virtual space of the open content, at block 16 of process 1600 the processor or dedicated graphics processing chip determines the portion of the content that is within the view field of the display.

Using the determined portion of the content within the view field, at block 18 of process 1600 the processor or dedicated graphics processing chip generates the image which is presented on the display. Changes in the viewing perspective of the mobile computing device 230 may be determined at block 22 of process 1600 by the processor or dedicated graphics processing chip receiving position or motion sensor data. At block 24 of process 1600 the processor or dedicated graphics processing chip can determine from such data a change in the view field with respect to the content fixed in virtual space. The operations of determining the position of the mobile computing device 230 in real or relatives space in block 14, determining the viewed portion of the content in block 16, and displaying that content in block 18, is then repeated until at decision block 20 of process 1600 it is determined that an input is received to switch back to the graphical user interface mode. When a graphical user interface activation input is received (i.e., decision block 20="Yes"), the processor or dedicated graphics processing chip switches user interface modes, returning to block 2 of process 1600 to determine the position of the file within the display window. In switching from mobile user interface mode to graphical user interface mode, the open content may be fixed relative to the mobile computing device 230 display 239 so that no change in the displayed image occurs as a result of the mode switch. Instead, the mechanism by which a user repositions the file with respect to the display changes to the conventional graphical user interface tools (i.e., pointing devices, such as touchscreens and arrow keys).

As mentioned above, the mobile user interface may also be implemented in a manner that enables viewing of three-dimensional information content (e.g., three-dimensional image files) in an intuitive manner. Thus, to look down into a three-dimensional image file a user may tip the mobile computing device 230 over as if turning a camera to look down. Similarly, to look up into a three-dimensional image file, a user may tilt the mobile computing device 230 up as if turning a camera to look up. Such up or down viewing of content may be supported by including one or more tilt sensors within the mobile computing device 230. Such tilt sensors can detect the orientation of the mobile computing device 230 with respect to the gravity vector and provide a signal to the processor or dedicated graphics processing chip which indicates the angle of tilt. Information from the tilt sensor can be utilized by the mobile computing device 230 processor or dedicated graphics processing chip to determine the portion of the three-dimensional content that should be presented in the display in a manner very similar to that described above with reference to FIG. 2. This implementation may be useful for viewing multi-dimensional image files which may be generated from numerous images taken at various angles. This implementation may also be used to sort through other forms of information, such as multi-document files or multipage documents. For example, the mobile user interface may be configured so that a forward tilt of the mobile computing device 230 prompts display of the next page of a multipage document. Thus, users may leaf through a multipage document simply by tilting their computing device 230 forward, and page back through the document by tilting their computing device 230 backward (i.e., towards themselves). Other uses of tilt sensors data may enable users to inspect content in a logical manner.

Figure 17:
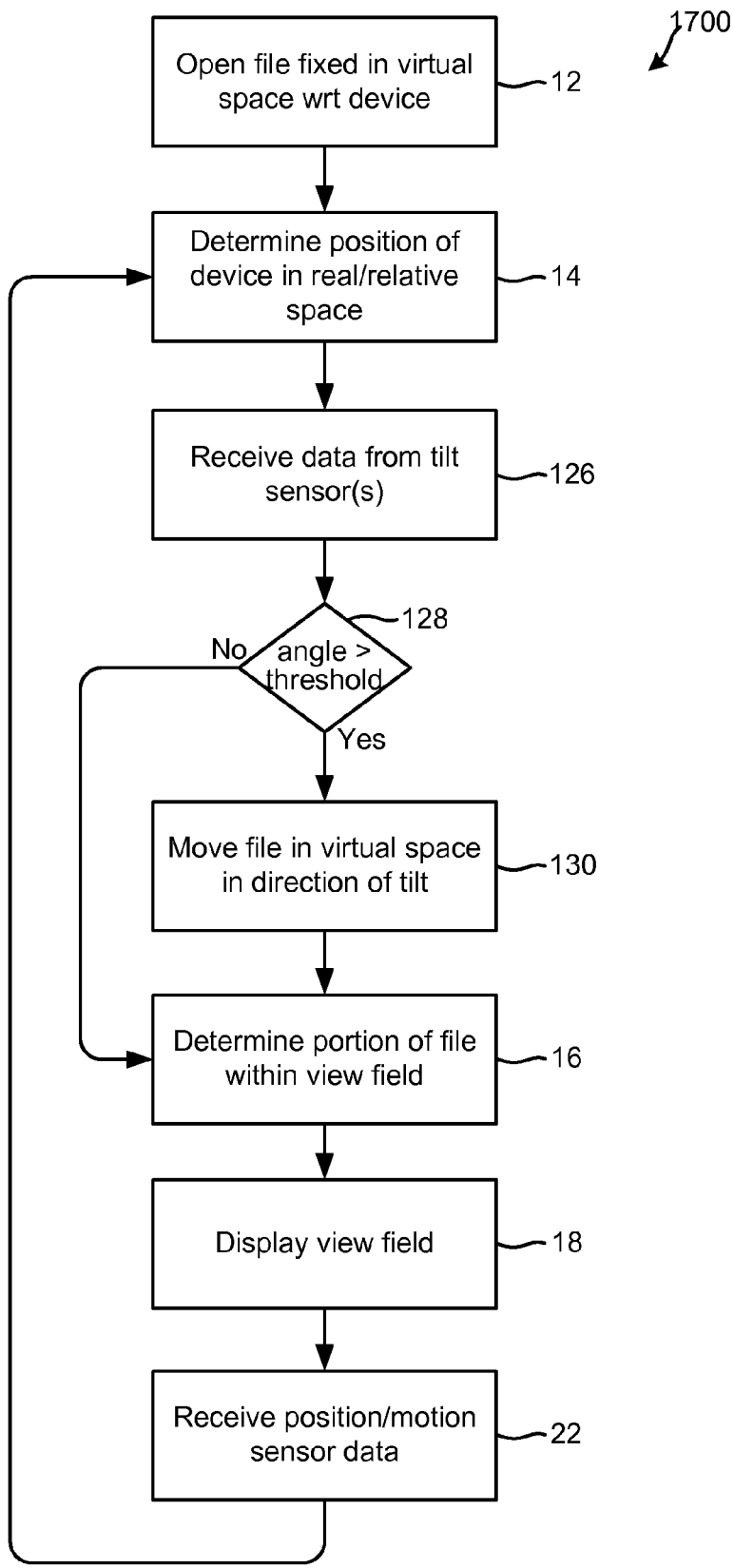
FIG. 17 is a process flow diagram illustrating operations for manipulating a document in virtual space and determining a portion of a document to be viewed on a mobile computing device based on information received from one or more tilt sensors.

Another example of the use of tilt sensor for inspecting content in a mobile user interface is illustrated in process 1700 shown in FIG. 17. In this implementation, a side-to-side tilt sensor (i.e., a sensor which can sense a tilt of the mobile computing device 230 to the right or left) is used in order to move the open content in virtual space. This implementation combines the presumption of a conventional graphical user interface that content is moved with respect to the display window with the mobile user interface presumption that the device 230 is moved with respect to the content. Thus, this combined capability may further improve the user experience by enabling both perceptions of content to be implemented at the user's discretion. In this implementation, at block 12 of process 1700 an open content may be fixed in virtual space with respect to the device 230. At block 14 of process 1700 the position of the mobile computing device 230 in real space may be determined as described more fully above with reference to FIG. 2. At block 126 of process 1700 the processor or dedicated graphics processing chip may receive data from a tilt sensor which may be in the form of a signal which indicates an angle, degree, or other measure of tilt with respect to the gravity vector. In some implementations it may be desirable to compare the tilt sensor data to a predetermined threshold value, as provided in decision block 128 of process 1700, so that minor unintentional tilting of the mobile computing device 230 can be ignored. If the sensed tilt angle of the mobile computing device 230 is less than the threshold value (i.e., decision block 128="No"), at block 16 of process 1700 the mobile user interface process may proceed to determine the portion of the open content that is within the view field. At block 18 of process 1700 the processor or dedicated graphics processing chip may generate a display of that portion of the content. At block 22 of process 1700 and the processor or dedicated graphics processing chip may receive position, motion, and/or orientation sensor information as described more fully above with reference to FIG. 2.

If the sensed tilt angle of the mobile computing device 230 exceeds the threshold value (i.e. decision block 128="Yes"), at block 130 of process 1700 the mobile user interface may move the open content in virtual space in the direction of the tilt angle. In other words, tilting the mobile computing device 230 can be interpreted by the mobile user interface as a user input to reposition the open content (i.e., file, document, or desktop) within virtual space. With the open content moved in virtual space, at block 16 of process 1700 the processor or dedicated graphics processing chip of the mobile computing device 230 can determine the portion of the open content that is within the view field. At block 18 of process 1700 the processor or dedicated graphics processing chip may generate a display of that portion of the content. At block 22 of process 1700 the processor or dedicated graphics processing chip may receive position, motion, and/or orientation sensor information as described more fully above with reference to FIG. 2. The process 1700 illustrated in FIG. 17 may be executed continuously on a frequent periodicity so that the open content continues to move in virtual space so long as the mobile computing device 230 is held at an angle to the gravity vector so that the generated display (block 18) shows the content moving across the screen. At any point the user can return the mobile computing device 230 to an upright orientation to stop movement of the open content in virtual space and then examine the content using the mobile user interface functionality in the manner described above with reference to FIG. 2.

The capability afforded by process 1700 illustrated in FIG. 17 may be useful when a user is in a setting where movement of the mobile computing device 230 in particular directions is restricted, such as by a wall or nearby people, or if the content extends beyond the range in which the user can maneuver the mobile computing device 230. For example, the open content could be a 360° panorama image (e.g., a panoramic image of the Grand Canyon) which the user could view by pivoting through 360° while holding the mobile computing device 230 in front of his/her eyes. However, if the user is seated, and thus cannot pivot through 360°, the capability provided by the process 1700 illustrated in FIG. 17 can permit the user to view the full content by tilting the mobile computing device 230 to cause the content to move past the display.

In an alternative implementation, multiple predetermined angle thresholds may be implemented to enable different functionality depending upon the angle at which the mobile computing device 230 is position. For example, the open content may move in virtual space at a first (e.g., slow) rate if the sensed tilt angle of the mobile computing device 230 exceeds a first threshold value but is less than a second threshold value, and move at a second (e.g., faster) rate when the sensed tilt angle exceeds the second threshold value. Other functions can be assigned to such tilt angle threshold values, with functions being user definable and/or content dependent. For example, instead of moving the content in virtual space, sensed tilt angles may be associated with functions to turn pages in a document with the second threshold associated with a rate of page turning.

Figure 18:
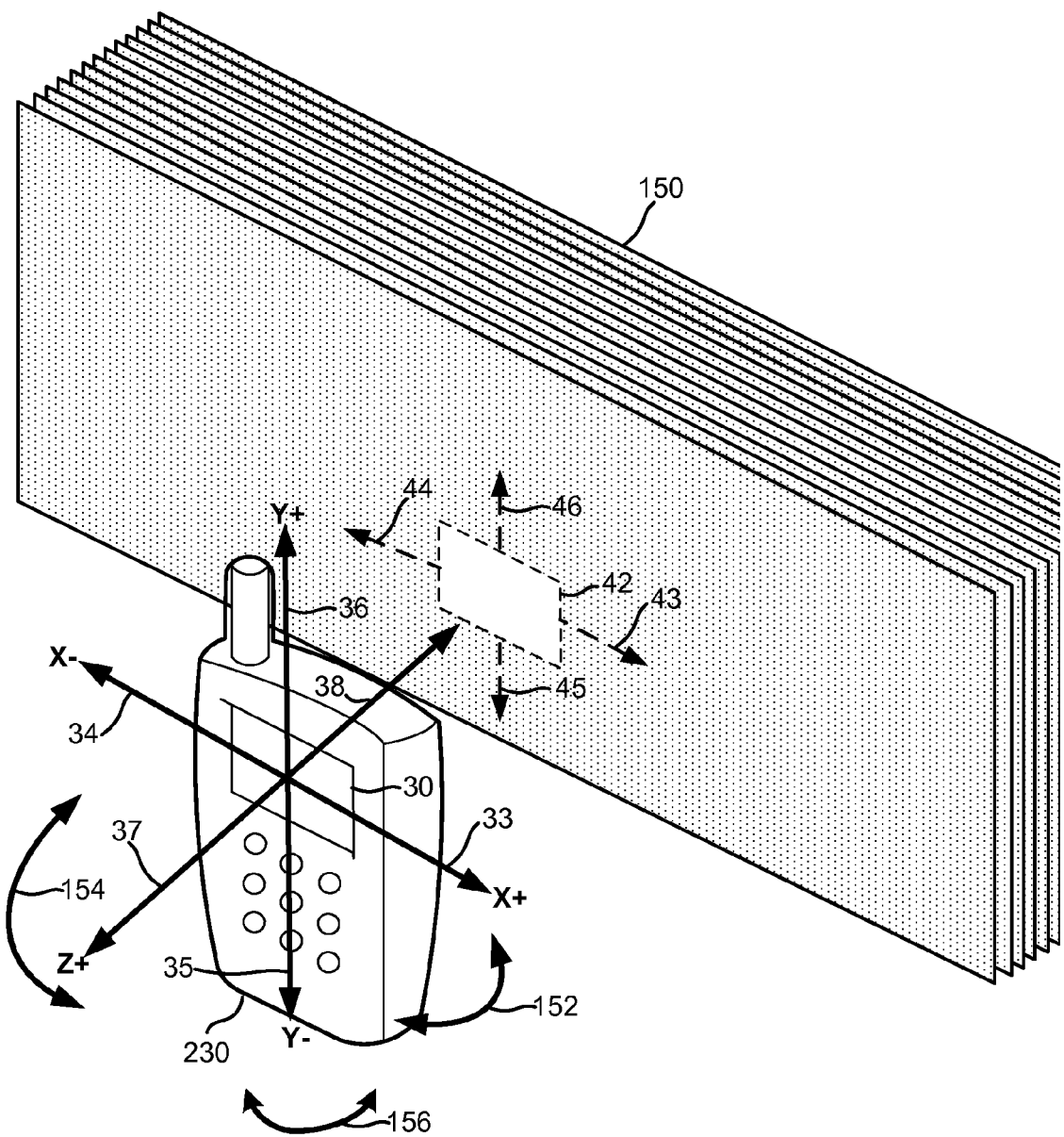
FIG. 18 is a perspective diagram illustrating a three-dimensional document positioned in virtual space relative to a mobile computing device in real space.

In a further aspect, the capability afforded by the processes illustrated in FIG. 17 may be combined with the process described above provided by forward and backward tilt sensors to provide a mobile user interface that can enable viewing of a 3-D data set or graphic with one hand. This is illustrated in FIG. 18 which how 3-D content 150 is presumed to be fixed in virtual space and viewed through the perspective of the display 30 of a mobile computing device 230 as if looking through the viewfinder of a video camera that can pan up and down. In addition to the X, Y, and Z axes described above with reference to FIG. 3, the mobile computing device 230 may include tilt sensors and orientation sensors to enable the processor or dedicated graphics processing chip to receive orientation information related to vertical twists 152 about the Y-axis, forward and backward tilt 154 about the X-axis, and side-to-side tilt 156 about the Z-axis. Sensor information regarding rotation 152 and tilt 154, 156 can be used by the mobile computing device 230 processor or dedicated graphics processing chip to determine the position and orientation of the viewed field 42 within the 3-D data set 150. As described above, if the mobile computing device 230 is tilted about the X-axis the viewed field 42 may be configured to view across several image slices within the 3-D data set 150 at a particular location within the data set depending upon the device's relative position in 3-D space as measured along the X, Y, and Z axes. Thus, while the 3-D data set 150 may remain fixed in virtual space, the viewed field 42 (i.e., the portion of the 3-D data set 150 which is presented in the display 30) may move left or right, up or down, as well as into the data set.

Figure 19:
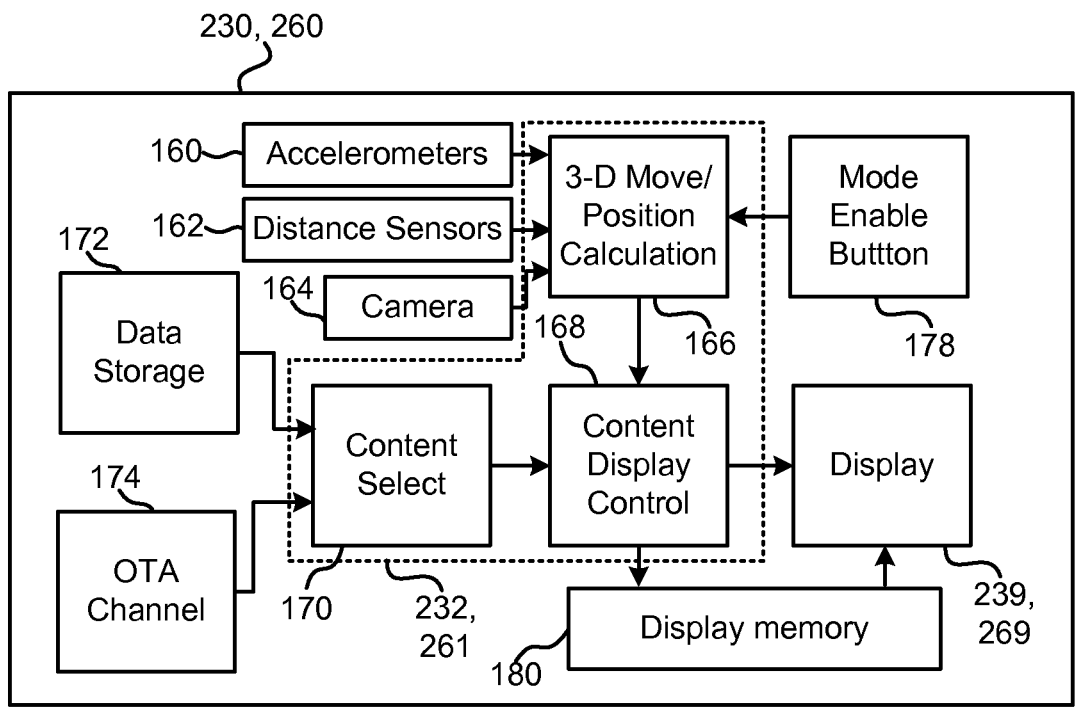

FIG. 19 illustrates a component block diagram of a portion of a mobile computing device 230, 260 illustrating functional components associated with a mobile user interface. Motion, position, and/or orientation sensors, such as accelerometers 160, distance sensors 162, and a camera 164, may be configured to provide inputs to a 3-D movement/position calculator 166. The 3-D movement/position calculator 166 may be a separate circuit element, or may be implemented as a function programmed into the processor or a dedicated graphics processing chip 232, 261 within the mobile computing device 230, 260. Position and orientation determinations calculated by the 3-D movement/position calculator 166 may be provided to a content display control 168, which may be a separate circuit element or another function programmed into a processor or dedicated graphics processing chip 232, 261. The content display control 168 may receive content, such as images, documents, or video, from a content select circuit or function 170, and determine from the calculated position and orientation of the mobile computing device 230, 260 the portion that is output to the display 239, 269. The content select circuit or function 170 may receive content from internal data storage 172 or from external sources such as via an over the air channel 174. The content display control 168 may work in cooperation with a display memory 180 which may store the pixel information used to generate images in the display 239, 269. The mobile computing device 230, 260 may also include a user interface mode enabled button 178 which when pressed informs the processor or dedicated graphics processing chip 232, 261 that the mobile user interface should be activated or that content centered in the display should be selected or activated.

Two alternative approaches for generating display images are supported by the component block diagram illustrated in FIG. 19. In a first approach, the entire content is downloaded from the content select 170 into the content display control 168, which then determines the portion of the content used to generate the appropriate image for presentation on the display 239, 269. In this first approach, the image information may be transmitted directly to the display 239, 269 or may be stored in the display memory 180 which is used by the display 239, 269 to generate images. In a second approach, the entire content provided by the content select 170 is downloaded to the display memory 180 and the content display control 168 informs the display 239, 269 of a subset of the data within the display memory 180 that should be used to generate images for display.

Figure 20:
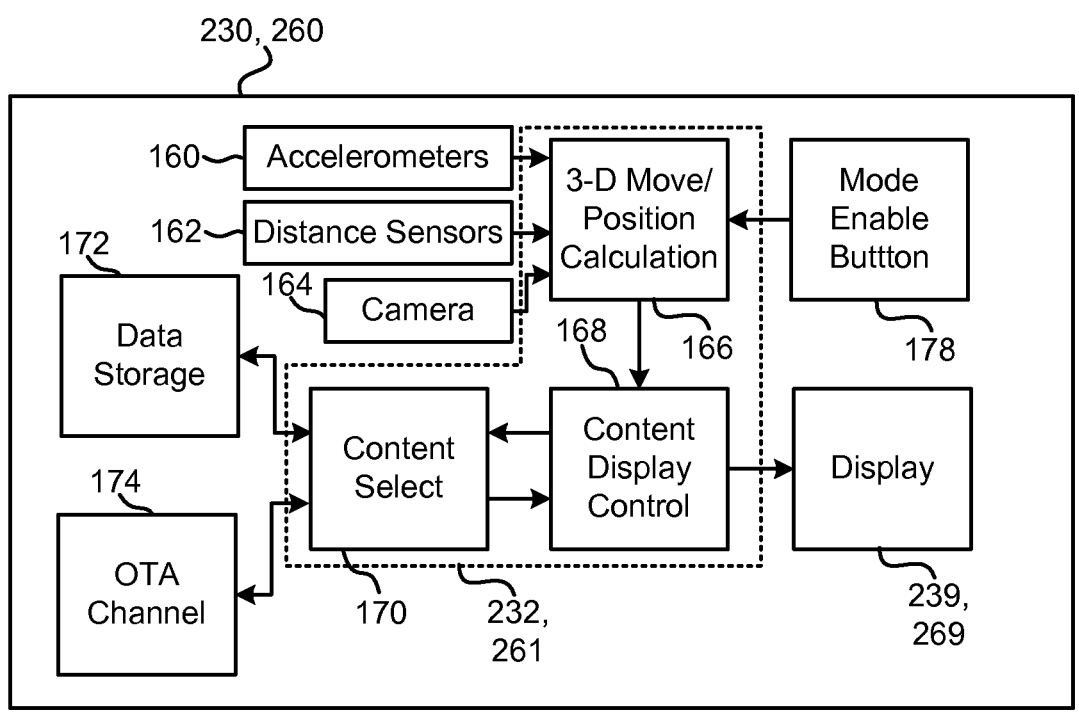
Figure 21:
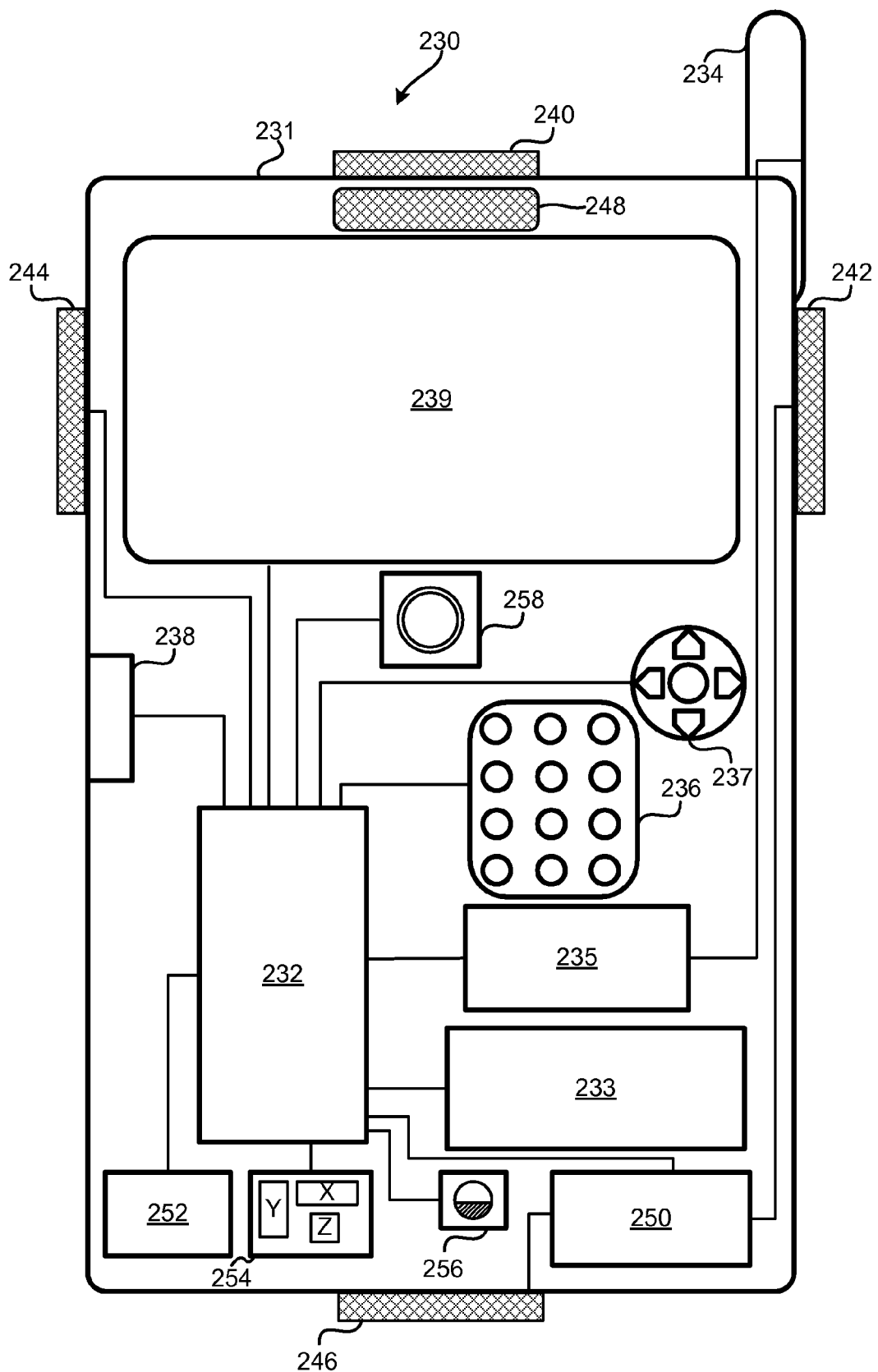
FIG. 21 is a component block diagram of an example mobile computing device suitable for use with the various aspects of the present invention.

FIG. 20 illustrates a component block diagram of a portion of a mobile computing device 230, 260 according to an alternative implementation of a mobile user interface. In this alternative implementation, the content display 168 identifies to the content select 170 the portion of an open content that should be provided for generating a display. The content select circuit or function 170 then interacts with either onboard data storage 172 or external sources, such as an over the air channel 174, to obtain the required content data which is provided to the content display control 168. The content display control 168 then uses the received information to generate an image which is provided to the display 239, 269.

The various aspects of the present invention described above may be implemented on any of a variety of mobile computing devices. Typically, such mobile computing devices 230 will have in common the components illustrated in FIG. 22. For example, mobile computing devices 230 may include a processor or dedicated graphics processing chip 232 coupled to internal memory 233 and a display 239, such as a liquid crystal display (LCD), all included within a case or housing 231. Additionally, the mobile computing device 230, such as a cellular telephone, may have an antenna 234 for sending and receiving electromagnetic radiation that is connected to a wireless data link and/or cellular telephone transceiver 235 coupled to the processor or dedicated graphics processing chip 232. In some implementations, the transceiver 235 and portions of the processor or dedicated graphics processing chip 232 and memory 233 used for cellular telephone communications is referred to as the air interface since it provides a data interface via a wireless data link. Mobile computing devices 230 also typically include a key pad 236 or miniature keyboard and menu selection buttons or rocker switches 237 which serve as pointing devices for receiving user inputs for positioning a cursor within the display 239. The processor or dedicated graphics processing chip 232 may further be connected to a wired network interface 238, such as a universal serial bus (USB) or FireWire® connector socket, for connecting the processor or dedicated graphics processing chip 232 to an external pointing device (e.g., a mouse) or computing device such as a personal computer 260 or external local area network.

The processor or dedicated graphics processing chip 232 may be any programmable microprocessor, microcomputer or multiple processor chip or chips that can be configured by software instructions (applications) to perform a variety of functions, including the functions of the various aspects described above. In some mobile computing device 230, multiple processors 232 may be provided, such as one processor dedicated to wireless communication functions and one processor dedicated to running other applications. The processor or dedicated graphics processing chip may also be included as part of a communication chipset. Typically, software applications may be stored in the internal memory 233 before they are accessed and loaded into the processor or dedicated graphics processing chip 232. In some mobile computing devices 230, the processor or dedicated graphics processing chip 232 may include internal memory sufficient to store the application software instructions. For the purposes of this description, the term memory refers to all memory accessible by the processor or dedicated graphics processing chip 232, including internal memory 233 and memory within the processor or dedicated graphics processing chip 232 itself. Application data files are typically stored in the memory 233. In many mobile computing devices 230, the memory 233 may be a volatile or nonvolatile memory, such as flash memory, or a mixture of both.

A mobile computing device 230 may also include motion and/or position sensors configured to provide the processor or dedicated graphics processing chip 232 with location and orientation information suitable for use in determining the appropriate user interface view. Such motion and/or position sensors may include one or more distance sensors 240, 242, 244, 246, 248, which may be coupled to a controller or distance measuring circuit 250, an electronic compass 252, one or more accelerometers 254, one or more tilt sensors 256 and a camera 258.

A variety of different distance sensors 240, 242, 244, 246, 248 may be used, including such as ultrasound transducers which measure distance by emitting and receiving inaudible ultrasound and measuring the time between emitted sound and received echoes, and radiofrequency (RF) transceivers which measure distance by emitting and receiving RF energy pulses and measuring the time between emitted and received pulses. The controller or measuring circuit 250 associated with distance sensors 240, 242, 244, 246, 248 may include pulse formation and detection circuitry configured to generate or control pulses emitted by the sensors along with processing circuitry to convert signal information into processor-interpretable distance measurement data that is provided to the mobile computing device processor or dedicated graphics processing chip 232. Alternatively, sensor control and measuring circuitry may be integrated into or within each sensor (e.g., a chip-based sensor) that is configured to communicate data directly to the mobile computing device processor or dedicated graphics processing chip 232. By measuring distance to objects, including the user, in three dimensions, the processor or dedicated graphics processing chip 232 can detect when the mobile computing device 230 is moved with respect to the surroundings. For example, a distance sensor 248 oriented to measure the distance in the Z+ direction 37 (see FIG. 3) can inform the processor or dedicated graphics processing chip 232 of the distance from the mobile computing device 230 to the user. This information can be used, for example, to determine a magnification factor to employ when determining the portion of a file to display as described above with reference to FIG. 6. As another example, distance sensors 242, 244 oriented on each side of the mobile computing device 230 can inform the processor or dedicated graphics processing chip 232 of lateral movement of the mobile computing device 230, such as when a user swings the mobile computing device 230 left or right at arms length. As another example, a distance sensor 246 oriented on a bottom surface of the mobile computing device 230 can inform the processor or dedicated graphics processing chip 232 of vertical movement of the mobile computing device 230 by measuring changes in the distance to the floor or a table or desk.

Any known type of electronic compass 252 may be included in the mobile computing device 230 to sense a direction of the display 239. As is well known, an electronic compass senses magnetic field lines of the Earth and may output a bearing, such as a degree relative to North. As the mobile computing device 230 is rotated with respect to the Earth's magnetic field, such rotation can be sensed by the compass 252 and relayed to the processor or dedicated graphics processing chip 232 as an absolute compass heading or a relative changing in heading. This information can be used by the processor or dedicated graphics processing chip 252 to determine the direction in which the display is oriented with respect to a document fixed in virtual space. Thus, as a user rotates the mobile computing device 230, such as by rotating the user's hand about the wrist or swinging the user's arm back and forth, the processor or dedicated graphics processing chip 252 can determine the viewing direction of the display 239 with respect to a document or file, and generate a view of the appropriate portion within the display 239.

The mobile computing device 230 may be equipped with one or more accelerometers 254. Any known type of accelerometer may be used, such as integrated accelerometer circuits which sense acceleration based upon the bend induced in small structures, such as microcantilevers. Accelerometer circuits may include separate accelerometers for each of three orthogonal directions (i.e., X, Y, Z axes) in order to sense motion in three-dimensional space. Additional accelerometers may also be employed to sense rotational motion in order to measure when the mobile computing device 230 is rotated about an axis. By integrating the sensed acceleration over short time periods, the processor or dedicated graphics processing chip 232 can calculate changes in position and orientation of the mobile computing device 230. Since accelerometer-determined positions may tend to drift due to sensitivity limits of the accelerometer sensors and accumulated math errors, accelerometers 254 may be used to provide relative motion estimates. Alternatively, accelerometers 254 may be combined with information from other position/orientation sensors, such as to improve the responsiveness of the user interface to rapid movements of the mobile computing device 230.

The mobile computing device 230 may be equipped with one or more tilt sensors 256. Any known type of tilt sensor may be used, such as integrated accelerometer circuits which sense orientation with respect to gravity based upon the bend induced in small structures, such as microcantilevers, fluid-based tilt sensors, and mechanical (e.g., pendulum) based tilt sensors. Two (or more) tilt sensors may be provided to enable sensing tilt of the mobile computing device 230 in both the side-to-side (i.e., roll) and front-to-back (i.e., pitch) directions. Data from such tilt sensors 256 can then be used by the processor or dedicated graphics processing chip 232 to determine orientation of the mobile computing device 230 with respect to the gravity vector (i.e., direction toward the center of the Earth). Thus, by combining information from two tilt sensors 256 and from an electric compass 252, the processor or dedicated graphics processing chip 232 can determine the orientation of the mobile computing device 230 (i.e., the direction in which the display is pointing) within three-dimensional space. Further processes for using a tilt sensor to provide information to the processor or dedicated graphics processing chip 232 in support of a mobile user interface are described above with reference to FIG. 17.

The mobile computing device 230 may also be equipped with a camera 258, which may be any form of digital imager. A camera 258 can be configured to obtain a series of digital images when the mobile computing device 230 is operating in the mobile user interface mode. As is well known in the digital imager arts, a digital image can be processed to detect motion within the image field. For example, digital images may be processed using known algorithms to recognize lines and edges, with the movement across the image of recognized lines and/or edges tracked to estimate movement of the mobile computing device 230 with respect to surrounding structures. As another example, digital images may be processed using known algorithms that segment the image into an array of sub-image blocks or elements with movement of features from one sub-image block or element to another used to estimate movement of the mobile computing device 230 with respect to surrounding structures. Further processes for using a camera 258 to provide position and orientation information to the processor or dedicated graphics processing chip 232 are described above with reference to FIG. 15.

Multiple types of motion/position sensors may be included within a mobile computing device 230 in order to provide multi-dimensional measurements as well as measurements based on complementary phenomenon. For example, as mentioned above, an electronic compass 252 can be combined with tilt sensors 256 to provide three-dimensional orientation information. Such sensors may be combined with a distance sensor 248 oriented to measure a distance between the mobile computing device 230 and a user. As another example, accelerometers 254 may be used in combination with distance sensors 240-248, compass sensors 252, and tilt sensors 256 to enable the processor or dedicated graphics processing chip 232 to sense and promptly react to quick movements, thereby accommodating lag in such sensors to provide a more responsive mobile user interface. As another example, a camera 258 may be used in combination with an electronic compass 252 and tilt sensors 256 to provide the processor or dedicated graphics processing chip 232 with all information needed to support the mobile user interface.

Figure 22:
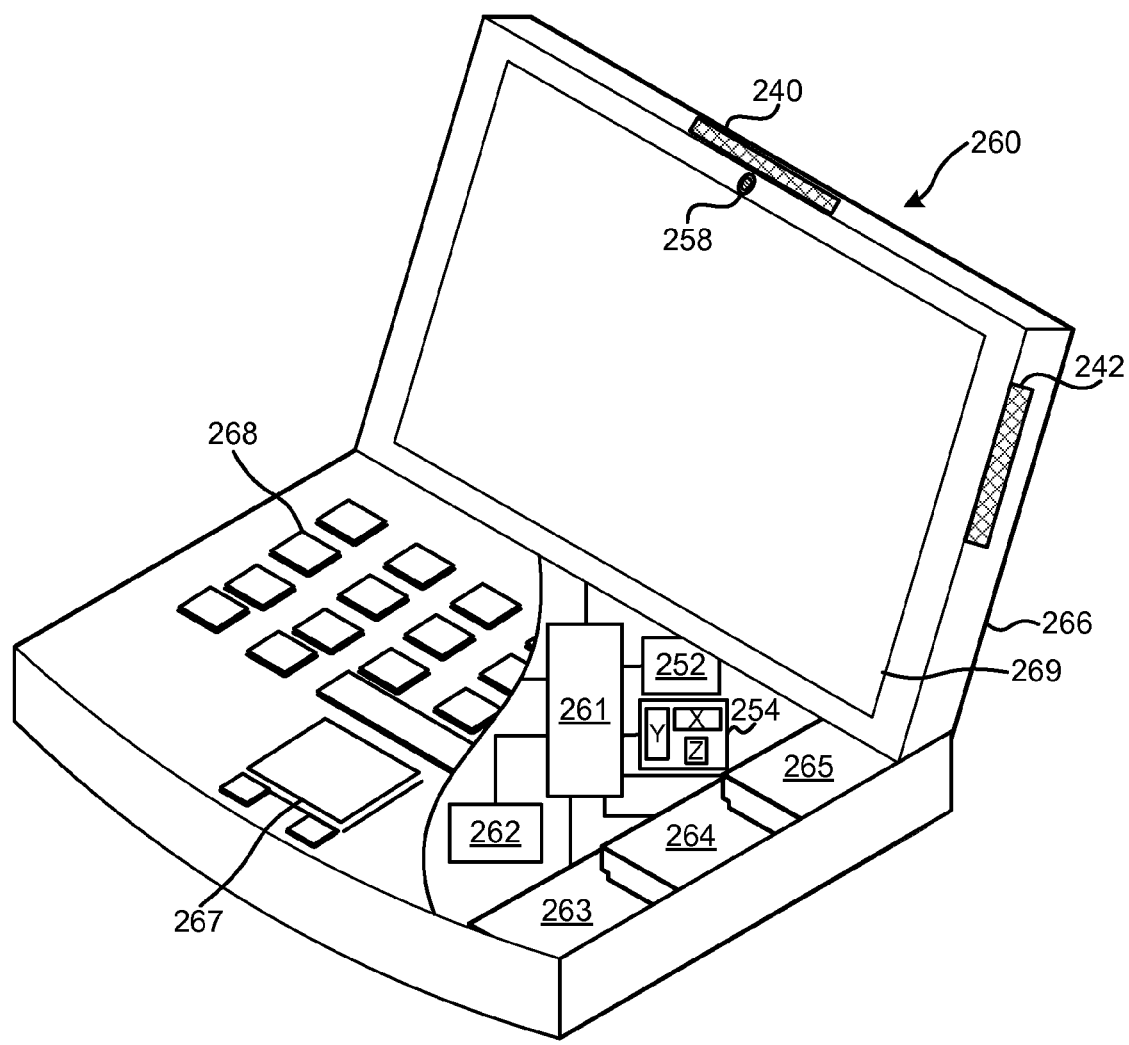
FIG. 22 is a component block diagram of an example notebook portable computing device suitable for use with the various aspects of the present invention.

The aspects described above may also be implemented on any of a variety of portable computing devices, such as a notebook computer 260 illustrated in FIG. 22. Such a notebook computer 260 typically includes a housing 266 that contains a processor 261 coupled to volatile memory 262 and a large capacity nonvolatile memory, such as a disk drive 263. The computer 260 may also include a floppy disc drive 264 and a compact disc (CD) drive 265 coupled to the processor 261. The computer housing 266 typically also includes a touchpad 267, keyboard 268, and the display 269.

The various aspects may be implemented by a computer processor 232, 261 executing software instructions configured to implement one or more of the described methods. Such software instructions may be stored in memory 262, 263 as separate applications, or as compiled software implementing an aspect method. Reference database may be stored within internal memory 233, 162, in hard disc memory 264, on tangible storage medium or on servers accessible via a network (not shown). Further, the software instructions and databases may be stored on any form of tangible processor-readable memory, including: a random access memory 233, 262, hard disc memory 263, a floppy disk (readable in a floppy disc drive 264), a compact disc (readable in a CD drive 265), electrically erasable/programmable read only memory (EEPROM), read only memory (such as FLASH memory), and/or a memory module (not shown) plugged into the computing device 231, 260, such as an external memory chip or a USB-connectable external memory (e.g., a "flash drive") plugged into a USB network port.

Similar to the mobile computing device 230, a notebook computer 260 may also include motion and/or position sensors 240-258 configured to provide the processor 261 with location and orientation information suitable for use in determining the appropriate user interface view. Such motion and/or position sensors may include each of the distance sensors 240, 242, 244, 246, 248, compass 252, accelerometers 254, tilt sensors 256, and camera 258 described above with reference to FIG. 22, with the processor 261 utilizing information from such sensors in a similar manner.

The true hand-held mobile user interface of the present invention provides a number of benefits. The mobile user interface allows content (e.g., documents, files, and desktop) to be much larger than the viewing window (i.e., display), so much so that that the content may be essentially boundless. The mobile user interface provides a natural user experience that avoids the need to translate eye movement into button clicks or touch-screen operations. Further, the mobile user interface enables users to view and navigate extended content without having to move a mental image of content (as required by conventional graphical user interfaces which presumes the display is fixed in space), and instead to move the mobile computing device around as necessary to view the content. In an aspect, the mobile user interface may be configured to enable users to view 3D content in a natural manner. These capabilities of the mobile user interface also can be controlled with a single hand which may be advantageous in several situations common in the use of mobile computing devices. Additionally, the capabilities afforded by the mobile user interface are likely to drive further advancements of building-block technologies including multimedia, interactive media, gaming, etc.

The usefulness of the various aspects of the mobile user interface can be illustrated by way of an example. A user browsing the web on a hand-held computing device using conventional graphical user interface may tap on or drag a finger across a touchscreen in order to traverse a page, select an option or selection a point to enter text. Using the conventional user interface, the user may zoom in on or out from content displayed on the touchscreen by double tapping on the touchscreen, for example. By dragging a finger across the touchscreen repeatedly the user can view more content.

At any time the user may elect to switch to the mobile user interface mode. By activating a "mode" button (such as clicking on a mode select icon on the touchscreen or pressing a physical mode-select button on the device) the user signals the mobile computing device to initiate the mobile user interface mode. When the mobile user interface is launched the open content is essentially frozen in virtual space at the current location shown in the display. The user may then review the open content by moving the mobile computing device horizontally and vertically in space to view different parts of the content as if reading a newspaper with a magnifying glass. The user may also zoom in on and out from the open content by moving the mobile computer device towards or away from the user as if inspecting a portion of a newspaper with a magnifying glass. The user may move to the next page in the open content by moving the mobile computing device horizontally and/or vertically so as to center an icon or link for "Next Page" within the display, and then press a select button or tap the "Next Page" icon on the touchscreen to bring up the next page of the open content.

At any time the user may elect to switch back to the conventional graphical user interface to view the rest of the open content in the conventional manner or select another file or document from a menu. For example, the user may need to walk or drive somewhere and want to avoid shifting the display due to such movements. Activating the user interface mode icon or button again activates the conventional graphical user interface mode, which un-freezes the location of content in virtual space and fixes the location of the content to the mobile computing device. Once the user is again at rest, the user may activate the user interface mode icon or button again to enter the mobile user interface mode, and continue viewing the content as described herein.

Another example of the usefulness of the mobile user interface is its ability to allow users to view images from a normal perspective. For example, users may view a 360-degree picture of the Grand Canyon, for example, on a mobile computing device by turning themselves around 360 degrees while viewing the display. In this manner the experience of viewing the picture is as if the users were looking through the preview window of a digital camera or camcorder standing at the Grand Canyon.

Another example application of the mobile user interface involves viewing of high definition video on mobile handheld devices. High definition video includes far more visual information than can be presented on the small screens of handheld devices. Using the mobile user interface, a user can zoom in on a particular portion of the video, such as an individual player in a sporting event, and watch that portion of the video by following the subject in virtual space as if filming with a video camera or looking through a telescope. In this manner, a high definition video will appear to be a large image, like a large screen television at a fixed distance from the user, which can be scanned by moving the mobile computing device left, right, up, and down. Since the operation of the mobile user interface is intuitive (as intuitive as a telescope or video camera), users can easily follow a single element, such as a player or a ball, as it moves about within the video image. For example, if a player is running from left to right across the high definition video image, a user can view that player by scanning the mobile computing device from left to right. This intuitive operation is very different from the user experience available in a conventional graphical user interface which requires a user to drag the video image from right to left to watch a player moving from left to right in the video image.

Many practical and useful applications may be enabled by the mobile user interface. For one, a mobile user interface including a Global Position System (GPS) receiver can use geographic location information to select and download location-specific content from internal or external storage (e.g., via an over-the-air data link) which can then be viewed using the mobile user interface. For example, a building inspector or an emergency responder (e.g., a fireman) user can download 2-D or 3-D building drawings (e.g., from a CAD database) corresponding the location of the user and then view the drawings using the mobile computing device like a camera. In this manner, users may be able to virtually look through walls by scanning their mobile computing devices back and forth. As another example, emergency responders may download images of a location where they are standing and then be able to view the before images of the scene before them, such as may be useful in disaster response situations.

It is anticipated that the mobile user interface will also drive the advance of building block technologies for hand-held computing devices that are enabled by the paradigm of fixing content in virtual space.

Those of skill in the art would appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components at blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a method described above and shown in the figures is for example purposes only as the order of some blocks may be changed from that described herein without departing from the spirit and scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile computing device. In the alternative, the processor and the storage medium may reside as discrete components in a user terminal or mobile computing device.

Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein, and instead the claims should be accorded the widest scope consistent with the principles and novel features disclosed herein.

What is claimed is:

1. A method for providing a mobile user interface on a mobile computing device, comprising:
  opening content treated as being fixed in virtual space;
  sensing a movement in real space of the mobile computing device;
  determining a change in position in real space of the mobile computing device based upon the sensed movement;
  determining a viewing perspective of the open content, wherein determining the viewing perspective comprises:
    determining a virtual movement scaling factor based on the open content; and
    applying the determined virtual movement scaling factor to the determined change in position of the mobile computing device; and
  generating a display of at least a portion of the open content based upon the determined viewing perspective.

2. The method of claim 1, further comprising:
  receiving a signal to select a selection of the content;
  determining a part of the content located near a center of the display; and
  selecting the part of the content located near a center of the display.

3. The method of claim 2, further comprising including a selection aid within the generated display, wherein the selection aid indicates one of the center of the display and the part of the content within the display that will be selected.

4. The method of claim 3, further comprising:
selecting a form of the selection aid depending upon the content located near the center of the display,
wherein the form of the selection aid is selected from the group consisting of crosshairs, a circle, an oval, a box, a region of enhanced brightness, a region of enhanced definition, and a region of shading.

5. The method of claim 2, wherein the signal to select a selection of the content is received as a result of a button press.

6. The method of claim 1, further comprising:
including a selection aid within the generated display, wherein the selection aid indicates a part of the content within the display that can be selected;
receiving a signal to select a selection of the content;
determining the part of the content located within the selection aid; and
performing an action on the part of the content located within the selection aid.

7. The method of claim 1, wherein sensing a movement in real space comprises receiving a signal from a sensor selected from the group consisting of an accelerometer, a distance measuring sensor, a tilt sensor, a camera, and a compass.

8. The method of claim 1, further comprising:
determining a distance between the mobile computing device and a user; and
applying a magnification to the displayed portion of the content based upon the determined distance.

9. The method of claim 1, further comprising:
sensing tilt of the mobile computing device; and
repositioning the content in virtual space based upon the sensed tilt.

10. The method of claim 1, wherein sensing a movement in real space comprises:
receiving a digital image from a camera;
comparing at least a portion of the received digital image to at least a portion of a previous digital image to identify a change in sequential images; and
determining a movement based upon the identified change in the sequential images.

11. The method of claim 1, further comprising:
receiving a user interface mode selection input while in a graphical user interface mode; and
fixing the content in virtual space based upon a display of the content in the graphical user interface mode.

12. The method of claim 1, further comprising:
receiving a user interface mode selection input while in the mobile user interface mode;
fixing the content in the a mobile computing device display; and
implementing the graphical user interface mode.

13. The method of claim 1, wherein the user interface mode selection input is received as a result of a button press.

14. A mobile computing device, comprising:
a processor;
a display coupled to the processor; and
a sensor coupled to the processor, the sensor selected from the group consisting of an accelerometer, a distance measuring sensor, a tilt sensor, a camera, and a compass,
wherein the processor is configured with software executable instructions to perform operations comprising:
opening content treated as being fixed in virtual space;
receiving a signal from the sensor;
determining a change in position in real space of the mobile computing device based upon the receive sensor signal;
determining a viewing perspective of the open content, wherein determining the viewing perspective comprises:
determining a virtual movement scaling factor based on the open content; and
applying the determined virtual movement scaling factor to the determined change in position of the mobile computing device; and
generating an image on the display of at least a portion of the open content based upon the determined viewing perspective.

15. The mobile computing device of claim 14, wherein the processor is configured with software executable instructions to perform operations further comprising:
receiving a signal to select a selection of the content;
determining a part of the content located near a center of the display; and
selecting the part of the content located near a center of the display.

16. The mobile computing device of claim 15, wherein the processor is configured with software executable instructions to perform operations further comprising including a selection aid within the generated display, wherein the selection aid indicates one of the center of the display and the part of the content within the display that will be selected.

17. The mobile computing device of claim 16, wherein the processor is configured with software executable instructions to perform operations further comprising:
selecting a form of the selection aid depending upon the content located near the center of the display,
wherein the form of the selection aid is selected from the group consisting of crosshairs, a circle, an oval, a box, a region of enhanced brightness, a region of enhanced definition, and a region of shading.

18. The mobile computing device of claim 15, further comprising a button coupled to the processor wherein the signal to select a selection of the content is received as a result of a press of the button.

19. The mobile computing device of claim 14, wherein the processor is configured with software executable instructions to perform operations further comprising:
including a selection aid within the generated display, wherein the selection aid indicates a part of the content within the display that can be selected;
receiving a signal to select a selection of the content;
determining the part of the content located within the selection aid; and
performing an action on the part of the content located within the selection aid.

20. The mobile computing device of claim 14, wherein the processor is configured with software executable instructions to perform operations sensing movement based upon the signal received from the sensor.

21. The mobile computing device of claim 14, wherein the processor is configured with software executable instructions to perform operations further comprising:
determining a distance between the mobile computing device and a user; and
applying a magnification to the displayed portion of the content based upon the determined distance.

22. The mobile computing device of claim 14, further comprising a tilt sensor coupled to the processor, the tilt sensor configured to sense tilt of the mobile computing device, wherein the processor is configured with software executable instructions to perform operations further comprising repositioning the content in virtual space based upon the sensed tilt.

23. The mobile computing device of claim 14, wherein:
the sensor comprises a camera; and
wherein the processor is configured with software executable instructions to perform operations such that sensing a movement in real space comprises:
receiving a digital image from the camera;
comparing at least a portion of the received digital image to at least a portion of a previous digital image to identify a change in sequential images; and
determining a movement based upon the identified change in the sequential images.

24. The mobile computing device of claim 14, wherein the processor is configured with software executable instructions to perform operations further comprising:
receiving a user interface mode selection input while in a graphical user interface mode;
fixing the content in virtual space based upon a display of the content in the graphical user interface mode; and
implementing a mobile user interface mode.

25. The mobile computing device of claim 24, wherein the processor is configured with software executable instructions to perform operations further comprising:
receiving a user interface mode selection input while in the mobile user interface mode;
fixing the content in the a mobile computing device display; and
implementing the graphical user interface mode.

26. The mobile computing device of claim 25, further comprising a button, wherein the user interface mode selection input is received as a result of a button press.

27. A mobile computing device, comprising:
means for opening content treated as being fixed in virtual space;
means for sensing a movement in real space of the mobile computing device;
means for determining a change in position in real space of the mobile computing device based upon the sensed movement;
means for determining a viewing perspective of the open content, wherein the means for determining the viewing perspective comprises:
means for determining a virtual movement scaling factor based on the open content; and
means for applying the determined virtual movement scaling factor to the determined change in position of the mobile computing device; and
means for generating a display of at least a portion of the open content based upon the determined viewing perspective.

28. The mobile computing device of claim 27, further comprising:
means for receiving a signal to select a selection of the content;
means for determining a part of the content located near a center of the display; and
means for selecting the part of the content located near a center of the display.

29. The mobile computing device of claim 28, further comprising means for including a selection aid within the generated display, wherein the selection aid indicates one of the center of the display and the part of the content within the display that will be selected.

30. The mobile computing device of claim 29, further comprising:
means for selecting a form of the selection aid depending upon the content located near the center of the display, wherein the form of the selection aid is selected from the group consisting of crosshairs, a circle, an oval, a box, a region of enhanced brightness, a region of enhanced definition, and a region of shading.

31. The mobile computing device of claim 28, wherein means for receiving a signal to select a selection of the content comprises means for an indication of a button press.

32. The mobile computing device of claim 27, further comprising:
means for including a selection aid within the generated display, wherein the selection aid indicates a part of the content within the display that can be selected;
means for receiving a signal to select a selection of the content;
means for determining the part of the content located within the selection aid; and
means for performing an action on the part of the content located within the selection aid.

33. The mobile computing device of claim 27, wherein means for sensing a movement in real space comprises means for receiving a signal from a sensor selected from the group consisting of:
means for sensing accelerometer;
means for measuring a distance
means for measuring a tilt;
means for obtaining a digital image; and
means for measuring orientation with respect to the Earth's magnetic field.

34. The mobile computing device of claim 27, further comprising:
means for determining a distance between the mobile computing device and a user; and
means for applying a magnification to the displayed portion of the content based upon the determined distance.

35. The mobile computing device of claim 27, further comprising:
means for sensing tilt of the mobile computing device; and
means for repositioning the content in virtual space based upon the sensed tilt.

36. The mobile computing device of claim 27, wherein sensing a movement in real space comprises:
means for obtaining a digital image;
means for comparing at least a portion of a first digital image to at least a portion of a second digital image to identify a change in sequential images; and
means for determining a movement based upon the identified change in the sequential images.

37. The mobile computing device of claim 27, further comprising:
means for receiving a user interface mode selection input while in a graphical user interface mode;
means for fixing the content in virtual space based upon a display of the content in the graphical user interface mode; and
means for implementing a mobile user interface mode.

38. The mobile computing device of claim 37, further comprising:
means for receiving a user interface mode selection input while in the mobile user interface mode;
means for fixing the content in the a mobile computing device display; and
means for implementing the graphical user interface mode.

39. The mobile computing device of claim 38, wherein means for receiving a user interface mode selection input comprising means for receiving an indication of a button press.

40. A non-transitory computer-readable storage medium having stored thereon processor-executable instructions configured to cause a processor of a mobile computing device to perform operations comprising:
    opening content treated as being fixed in virtual space;
    receiving a signal from a sensor selected from the group consisting of an accelerometer, a distance measuring sensor, a tilt sensor, a camera, and a compass;
    determining a change in position in real space of a mobile computing device based upon the receive sensor signal;
    determining a viewing perspective of the open content, wherein determining the viewing perspective comprises:
        determining a virtual movement scaling factor based on the open content; and
        applying the determined virtual movement scaling factor to the determined change in position of the mobile computing device; and
    generating an image on a display of at least a portion of the open content based upon the determined viewing perspective.

41. The non-transitory computer-readable storage medium of claim 40, wherein the stored processor-executable instructions are configured to cause a processor of a mobile computing device to perform operations further comprising:
    receiving a signal to select a selection of the content;
    determining a part of the content located near a center of the display; and
    selecting the part of the content located near a center of the display.

42. The non-transitory computer-readable storage medium of claim 41, wherein the stored processor-executable instructions are configured to cause a processor of a mobile computing device to perform operations further comprising including a selection aid within the generated display, wherein the selection aid indicates one of the center of the display and the part of the content within the display that will be selected.

43. The non-transitory computer-readable storage medium of claim 42, wherein the stored processor-executable instructions are configured to cause a processor of a mobile computing device to perform operations further comprising:
    selecting a form of the selection aid depending upon the content located near the center of the display,
    wherein the form of the selection aid is selected from the group consisting of crosshairs, a circle, an oval, a box, a region of enhanced brightness, a region of enhanced definition, and a region of shading.

44. The non-transitory computer-readable storage medium of claim 42, wherein the stored processor-executable instructions are configured to cause a processor of a mobile computing device to perform operations further comprising receiving the signal to select a selection of the content as a result of a button press.

45. The non-transitory computer-readable storage medium of claim 40, wherein the stored processor-executable instructions are configured to cause a processor of a mobile computing device to perform operations further comprising:
    including a selection aid within the generated display, wherein the selection aid indicates a part of the content within the display that can be selected;
    receiving a signal to select a selection of the content;
    determining the part of the content located within the selection aid; and
    performing an action on the part of the content located within the selection aid.

46. The non-transitory computer-readable storage medium of claim 40, wherein the stored processor-executable instructions are configured to cause a processor of a mobile computing device to perform operations further comprising sensing movement based upon the signal received from the sensor.

47. The non-transitory computer-readable storage medium of claim 40, wherein the stored processor-executable instructions are configured to cause a processor of a mobile computing device to perform operations further comprising:
    determining a distance between the mobile computing device and a user; and
    applying a magnification to the displayed portion of the content based upon the determined distance.

48. The non-transitory computer-readable storage medium of claim 40, wherein the stored processor-executable instructions are configured to cause a processor of a mobile computing device to perform operations further comprising repositioning the content in virtual space based upon the sensed tilt.

49. The non-transitory computer-readable storage medium of claim 40, wherein the stored processor-executable instructions are configured to cause a processor of a mobile computing device to perform operations such that sensing a movement in real space comprises:
    receiving a digital image from the camera;
    comparing at least a portion of the received digital image to at least a portion of a previous digital image to identify a change in sequential images; and
    determining a movement based upon the identified change in the sequential images.

50. The non-transitory computer-readable storage medium of claim 40, wherein the stored processor-executable instructions are configured to cause a processor of a mobile computing device to perform operations further comprising:
    receiving a user interface mode selection input while in a graphical user interface mode;
    fixing the content in virtual space based upon a display of the content in the graphical user interface mode; and
    implementing a mobile user interface mode.

51. The non-transitory computer-readable storage medium of claim 50, wherein the stored processor-executable instructions are configured to cause a processor of a mobile computing device to perform operations further comprising:
    receiving a user interface mode selection input while in the mobile user interface mode;
    fixing the content in the a mobile computing device display; and
    implementing the graphical user interface mode.

52. The non-transitory computer-readable storage medium of claim 51, the stored processor-executable instructions are configured to cause a processor of a mobile computing device to perform operations further comprising for receiving the user interface mode selection input as a result of a button press.

* * * * *